(12) United States Patent
Kita et al.

(10) Patent No.: US 11,803,107 B2
(45) Date of Patent: Oct. 31, 2023

(54) INTERCHANGEABLE LENS, FOCUS DETECTING DEVICE, AND CAMERA BODY

(71) Applicant: NIKON CORPORATION, Tokyo (JP)

(72) Inventors: Yuki Kita, Kawasaki (JP); Akira Kinoshita, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 13 days.

(21) Appl. No.: 17/418,138

(22) PCT Filed: Dec. 26, 2019

(86) PCT No.: PCT/JP2019/051268
§ 371 (c)(1),
(2) Date: Feb. 7, 2022

(87) PCT Pub. No.: WO2020/138350
PCT Pub. Date: Jul. 2, 2020

(65) Prior Publication Data
US 2022/0187686 A1  Jun. 16, 2022

(30) Foreign Application Priority Data
Dec. 26, 2018 (JP) ................................. 2018-242351

(51) Int. Cl.
*G03B 17/14* (2021.01)
*G02B 7/34* (2021.01)
(Continued)

(52) U.S. Cl.
CPC .............. *G03B 17/14* (2013.01); *G02B 7/34* (2013.01); *G03B 13/36* (2013.01); *H04N 23/672* (2023.01)

(58) Field of Classification Search
CPC ...... G03B 17/14; G03B 13/36; G03B 17/565; G02B 7/34; H04N 5/232122;
(Continued)

(56) References Cited

U.S. PATENT DOCUMENTS

| 4,908,505 A | 3/1990 | Taniguchi et al. |
| 2011/0063484 A1 | 3/2011 | Fujii et al. |

(Continued)

FOREIGN PATENT DOCUMENTS

| JP | S63-286811 A | 11/1988 |
| JP | 2009-204987 A | 9/2009 |

(Continued)

OTHER PUBLICATIONS

JP 2017219791 A, English Translation (Year: 2017).*
Mar. 24, 2020 International Search Report issued in International Patent Application No. PCT/JP2019/051268.
Mar. 24, 2020 Written Opinion issued in International Patent Application No. PCT/JP2019/051268.
(Continued)

*Primary Examiner* — Shahbaz Nazrul
(74) *Attorney, Agent, or Firm* — Oliff PLC

(57) ABSTRACT

An interchangeable lens which is mountable in and removable from a camera body having an imaging part, includes an optical system in which an exit pupil distance changes according to a position of the imaging part on an imaging surface, an input part in which information on a position on the imaging surface is input from the camera body, and an output part which outputs first information regarding the exit pupil distance of the optical system based on the information input to the input part to the camera body.

15 Claims, 20 Drawing Sheets

(51) Int. Cl.
*G03B 13/36* (2021.01)
*H04N 23/67* (2023.01)

(58) Field of Classification Search
CPC .............. H04N 5/23209; H04N 5/225; H04N 5/36961; H04N 23/672; H04N 23/00; H04N 23/663; H04N 25/704
See application file for complete search history.

(56) References Cited

U.S. PATENT DOCUMENTS

| | | | |
|---|---|---|---|
| 2016/0073005 A1 | 3/2016 | Sugita et al. | |
| 2019/0158744 A1* | 5/2019 | Saito | H04N 5/23264 |
| 2021/0377438 A1* | 12/2021 | Kita | H04N 5/36961 |
| 2022/0206368 A1* | 6/2022 | Kikuchi | G02B 17/0808 |

FOREIGN PATENT DOCUMENTS

| | | |
|---|---|---|
| JP | 2016-090798 A | 5/2016 |
| JP | 2017-219791 A | 12/2017 |

OTHER PUBLICATIONS

Mar. 2, 2022 Office Action issued in Chinese Patent Application No. 201980092153.4.
Apr. 12, 2012 Office Action issued in Japanese Patent Application No. 2020-562444.
Nov. 29, 2022 Office Action issued in Japanese Patent Application No. 2020-562444.
Dec. 12, 2022 Office Action issued in Chinese Patent Application No. 201980092153.4.
Jun. 27, 2023 Office Action issued in Chinese Patent Application No. 201980092153.4.

* cited by examiner (a)

(b)

(c)

(d)

| FOCUSING LENS POSITION SECTION | Z1 | Z2 | ... | Zn |
|---|---|---|---|---|
| CONSTANT TERM Co | Poz1 | Poz2 | ... | Pozn |
| COEFFICIENT h4 | h4z1 | h4z2 | ... | h4zn |
| COEFFICIENT h2 | h2z1 | h2z2 | ... | h2zn |

| SECTION | W1 | W2 | ... | Wn |
|---|---|---|---|---|
| CONSTANT TERM Co | Pow1 | Pow2 | ... | Pown |
| COEFFICIENT h4 | h4w1 | h4w2 | ... | h4wn |
| COEFFICIENT h2 | h2w1 | h2w2 | ... | h2wn |

INTERCHANGEABLE LENS, FOCUS DETECTING DEVICE, AND CAMERA BODY

TECHNICAL FIELD

The present invention relates to an interchangeable lens, a focus detecting device, and a camera body.

BACKGROUND ART

An imaging device in which focus detection is performed by selecting an AF pixel pair from a plurality of types of AF pixel pairs according to an exit pupil position of a lens is known (Patent Literature 1 (Japanese Unexamined Patent Application, First Publication No. 2009-204987)). Conventionally, improvement in focus detection accuracy has been required.

SUMMARY OF INVENTION

According to a first aspect of the invention, an interchangeable lens is one which is mountable in and removable from a camera body having an imaging part, and includes an optical system in which an exit pupil distance changes according to a position of the imaging part on an imaging surface, an input part in which information on a position on the imaging surface is input from the camera body, and an output part which outputs first information regarding the exit pupil distance of the optical system based on the information input to the input part to the camera body.

According to a second aspect of the invention, a focus detecting device includes an imaging part having first and second pixels which receive light that has passed through an optical system and output a signal used for focus detection, a selection part which selects first focus detection based on a signal output from a first pixel or second focus detection based on a signal output from a second pixel on a basis of first information on an exit pupil distance of the optical system based on information on a position of the imaging part on an imaging surface, and a focus detection part which performs the first focus detection or the second focus detection based on selection of the selection part.

According to a third aspect of the invention, a camera body includes the focus detecting device according to the second aspect, and a mounting and removing part which an interchangeable lens having the optical system is mountable on and removable from.

DESCRIPTION OF EMBODIMENTS

First Embodiment

Figure 1:
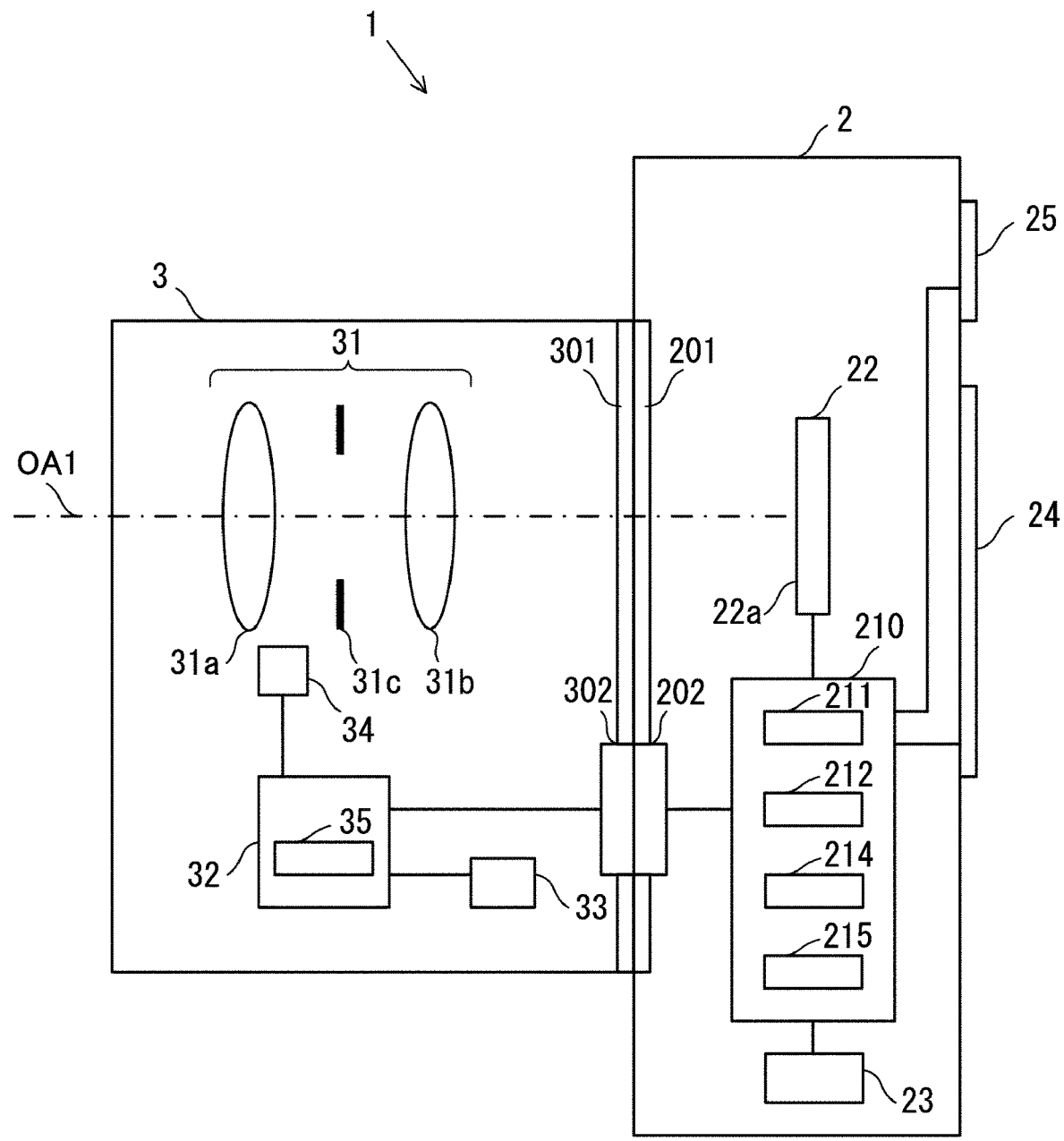
FIG. 1 is a diagram showing a constitution example of an imaging device according to a first embodiment.

FIG. 1 is a diagram showing a constitution example of an electronic camera 1 (hereinafter referred to as a camera 1) which is an example of an imaging device according to a first embodiment. The camera 1 is configured to have a camera body 2 and an interchangeable lens 3. Since the camera 1 is configured to have the camera body 2 and the interchangeable lens 3, it may be called a camera system.

A body-side mount part 201 on which the interchangeable lens 3 is mounted is provided on the camera body 2. A lens-side mount part 301 which is mounted on the camera body 2 is provided at the interchangeable lens 3. A lens-side connection part 302 and a body-side connection part 202 are respectively provided in the lens-side mount part 301 and the body-side mount part 201. A plurality of terminals such as a clock signal terminal, a data signal terminal, and a power supply terminal are provided on each of the lens-side connection part 302 and the body-side connection part 202. The interchangeable lens 3 is removably mounted on the camera body 2 by the lens-side mount part 301 and the body-side mount part 201.

When the interchangeable lens 3 is mounted on the camera body 2, the terminal provided on the body-side connection part 202 and the terminal provided on the lens-side connection part 302 are electrically connected. Thus, power can be supplied from the camera body 2 to the interchangeable lens 3, and communication between the camera body 2 and the interchangeable lens 3 is enabled.

The interchangeable lens 3 includes a photographing optical system (an imaging optical system) 31, a lens control part 32, a lens memory 33, and a state detection part 34. The photographing optical system 31 includes a plurality of lenses including a zoom lens (a variable magnification lens) 31a and a focus lens (a focus adjustment lens) 31b which change a focus distance, and an aperture 31c, and forms a subject image on an imaging surface 22a of an imaging element 22. Although the zoom lens 31a and the focus lens 31b are schematically shown in FIG. 1, a normal photographing optical system is generally constituted of a large number of optical elements.

Further, as will be described later, the photographing optical system 31 of the interchangeable lens 3 has optical characteristics in which a position of an exit pupil, that is, an exit pupil distance, changes according to an image height. In other words, the exit pupil distance of the photographing optical system 31 changes according to a position on the imaging surface 22a, that is, a distance from an optical axis OA1 of the photographing optical system 31 on the imaging surface 22a. The optical axis OA1 of the photographing optical system 31 intersects the imaging surface 22a at a center position on the imaging surface 22a. It can be said that the exit pupil distance of the photographing optical system 31 changes according to a distance from a center of the imaging surface 22a. Here, the exit pupil distance is a distance between the exit pupil of the photographing optical system 31 and an image plane of an image formed by the photographing optical system 31. The imaging surface 22a of the imaging element 22 is, for example, a surface on which a photoelectrical conversion part that will be described later is disposed or a surface on which a microlens is disposed.

Further, the photographing optical system 31 differs according to a type of the interchangeable lens 3 mounted on the body-side mount part 201. Therefore, the exit pupil distance of the photographing optical system 31 differs according to the type of the interchangeable lens 3. Furthermore, the optical characteristics of the exit pupil distance which changes according to the image height also differ according to the type of the interchangeable lens 3.

The lens control part 32 is configured to include a processor such as a CPU, FPGA, or ASIC, and a memory such as ROM or RAM, and controls each part of the interchangeable lens 3 based on a control program. The lens control part 32 controls a position of the zoom lens 31a, a position of the focus lens 31b, and drive of the aperture 31c based on a signal output from a body control part 210 of the camera body 2. When a signal indicating a movement direction, an amount of movement and the like of the focus lens 31b is input from the body control part 210, the lens control part 32 adjusts a focus position of the photographing optical system 31 by moving the focus lens 31b forward and backward in a direction of the optical axis OA1 based on the signal. Further, the lens control part 32 controls a position of the zoom lens 31a and an opening diameter of the aperture 31c based on the signal output from the body control part 210 of the camera body 2.

Further, the lens control part 32 has a distance calculation part 35 which calculates the exit pupil distance of the photographing optical system 31 at each of the image heights. The processing performed by the distance calculation part 35 will be described later.

The lens memory 33 is configured to have a non-volatile storage medium or the like. Information regarding the interchangeable lens 3 is stored (recorded) in the lens memory 33. As will be described later, in the lens memory 33 according to the present embodiment, information which indicates the exit pupil distance (Co) at a position at which the imaging surface 22a and the optical axis OA1 intersect (a position at which the image height is zero), and information on coefficients (h4 and h2) included in an operation expression which indicates the relationship between the exit pupil distance and the image height are stored as information used for calculation of the exit pupil distance (hereinafter referred to as calculation information). The calculation information may be stored in an internal memory of the lens control part 32. Further, the lens memory 33 stores data on an infinity position or a closest position of the focus lens 31b, data on a shortest focus distance and a longest focus distance of the interchangeable lens 3, data on an F value (an aperture value of the aperture 31c), and the like. Writing of data to the lens memory 33 and reading of data from the lens memory 33 are controlled by the lens control part 32.

The state detection part 34 has an encoder which detects the position of the zoom lens 31a and detects the focus distance of the photographing optical system 31 based on a signal output from the encoder. The state detection part 34 outputs information which indicates the focus distance (focus distance information) as a detection result to the lens control part 32.

Further, the lens control part 32 performs communication for bidirectionally transmitting and receiving information between the camera body 2 and the interchangeable lens 3 via the terminals of the lens-side connection part 302 and the body-side connection part 202. The lens control part 32 transmits the focus distance information acquired from the state detection part 34, the information on the position of the focus lens 31b, the information on the F value of the aperture 31c, and the like to the body control part 210.

Next, the constitution of the camera body 2 will be described. The camera body 2 includes an imaging element 22, a body memory 23, a display part 24, an operation part 25, and the body control part 210. The imaging element 22 is a CMOS image sensor or a CCD image sensor. The imaging element 22 captures a subject image formed by the photographing optical system 31. In the imaging element 22, a plurality of pixels having the photoelectrical conversion part are disposed two-dimensionally (in a row direction and a column direction). The photoelectrical conversion part is constituted of a photodiode (PD). The imaging element 22 performs photoelectrical conversion of received light at the photoelectrical conversion part to generate a signal and outputs the generated signal to the body control part 210.

As will be described later, the imaging element 22 has an imaging pixel which outputs a signal used for image generation and a focus detection pixel which outputs a signal used for focus detection. The imaging pixel includes a pixel (hereinafter referred to as an R pixel) having a filter having spectral characteristics which spectrally disperse light in a first wavelength region (red (R) light) in incident light, a pixel (hereinafter referred to as a G pixel) having a filter having spectral characteristics which spectrally disperse light in a second wavelength region (green (G) light) in the incident light, and a pixel (hereinafter referred to as a B pixel) having a filter having spectral characteristics which spectrally disperse light in a third wavelength region (blue (B) light) in the incident light. The R pixel, the G pixel, and the B pixel are disposed according to a Bayer array. The focus detection pixels are disposed to be replaced with some of the imaging pixels and are dispersed and disposed on substantially the entire imaging surface 22a of the imaging element 22.

The body memory 23 is configured to have a non-volatile storage medium or the like. Image data, a control program, and the like are recorded in the body memory 23. The writing of data to the body memory 23 and the reading of data from the body memory 23 are controlled by the body control part 210. The display part 24 displays an image based on image data, an image showing a focus detection region (an AF region) such as an AF frame, information on photographing such as a shutter speed and an F value, a menu screen, and the like. The operation part 25 includes various setting switches such as a release button, a power switch, and a switch for switching various modes, and outputs an operation signal corresponding to each operation to the body control part 210.

The body control part 210 is configured to have a processor such as a CPU, FPGA, or ASIC, and a memory such as ROM or RAM, and controls each part of the camera 1 based on a control program. The body control part 210 includes an image data generation part 211, a region setting part 212, a selection part 214, and a focus detection part 215. The image data generation part 211 generates image data by performing a variety of image processing on the signal output from the imaging pixel of the imaging element 22. The image data generation part 211 may also generate image data using the signal output from the focus detection pixel.

The region setting part 212 sets (selects) at least one focus detection region 100 among a plurality of focus detection regions 100 provided on the imaging surface 22a of the imaging element 22 shown in FIG. 2(a). A plurality of AF frames displayed on the display part 24 correspond to each of the plurality of focus detection regions 100 provided on the imaging element 22. In the plurality of AF frames displayed on the display part 24, the region setting part 212 sets the focus detection region 100 corresponding to the AF frame selected by a user operating the operation part 25, or the focus detection region 100 automatically selected by the camera 1 as a region in which focus detection is performed. As will be described later, the focus detection part 215 detects an amount of deviation (an amount of defocus) between the image obtained by the photographing optical system 31 and the imaging surface 22a using the signal output from the focus detection pixel in the focus detection region 100 set by the region setting part 212.

As schematically shown in FIG. 2(b), in the focus detection region 100, pairs of focus detection pixels (AF pixel pairs) of a plurality of types, that is, a first AF pixel pair, a second AF pixel pair, and a third AF pixel pair, are disposed in the present embodiment, in addition to the imaging pixels.

The first AF pixel pair, the second AF pixel pair, and the third AF pixel pair are disposed to accurately detect the amount of defocus even at an exit pupil distance which differs according to the image height or the type of interchangeable lens. One focus detection pixel constituting the AF pixel pair outputs a first signal Sig1, and the other focus detection pixel constituting the AF pixel pair outputs a second signal Sig2. The first AF pixel pair, the second AF pixel pair, and the third AF pixel pair will be described later.

As shown in FIG. 2(a), the plurality of focus detection regions 100 are disposed in a two-dimensional direction (the row direction and the column direction) and are provided at positions having different image heights. A small region 110a (refer to FIG. 2(b)) in a central focus detection region 100a of the imaging surface 22a is located on the optical axis OA1 of the photographing optical system 31, and an image height H thereof is substantially zero. The image height H of the focus detection region 100 increases as a distance from a center of the imaging surface 22a (the optical axis OA1 of the photographing optical system 31) increases. In other words, the image height H of the focus detection region 100 increases as the distance from the center of the imaging surface 22a increases. Therefore, in a row in which the focus detection region 100a is located, the focus detection regions 100 farthest from the optical axis OA1 of the photographing optical system 31 (the highest image height H) are focus detection regions 100b and 100c located at a left end (an end in a −X direction) and a right end (an end in a +X direction) of the row. The focus detection regions 100 having the highest image height H in the imaging element 22 are four focus detection regions 100 at corners of the imaging surface 22a.

Since the focus detection region 100 has a predetermined area, the image height differs for each of the focus detection pixels according to a position in the focus detection region 100. The image heights are different in the central small region 110a (refer to FIG. 2(b)) and small regions 110b and 110c (refer to FIG. 2(b)) located at the left end (the end in the −X direction) and the right end (the end in the +X direction) within the same focus detection region 100. However, in the present embodiment, a value of the image height H at a center position of one focus detection region 100 is used as a value of the image height of the entire focus detection region 100. The image height of the central focus detection region 100a of the imaging surface 22a is zero, and the image heights of the focus detection regions 100b and 100c are predetermined image heights H.

The body control part 210 outputs information (hereinafter referred to as position information) on the position of the focus detection region 100 set by the region setting part 212 to the interchangeable lens 3. In the present embodiment, the position information is information which indicates a distance of the set focus detection region 100 from the optical axis OA1 and indicates the image height of the focus detection region 100. The position information is information which indicates a distance between the optical axis OA1 of the photographing optical system 31 and the center position of the focus detection region 100. When the plurality of focus detection regions 100 are set by the region setting part 212, the body control part 210 outputs the position information on a position of the focus detection region 100 having the highest image height to the interchangeable lens 3. The position information output from the body control part 210 to the interchangeable lens 3 is input to the lens control part 32 of the interchangeable lens 3.

The distance calculation part 35 of the lens control part 32 calculates the exit pupil distance of the photographing optical system 31 at the image height H. The distance calculation part 35 calculates the exit pupil distance Po (H) of the photographing optical system 31 at the image height H of the focus detection region 100 set by the region setting part 212 by the following Equation (1) based on the position information input to the lens control part 32.

$$Po(H)=h4 \times H^4 + h2 \times H^2 + Co \tag{1}$$

Equation (1) is an operation expression with the image height H as a variable, a parameter (h4) is a coefficient of a fourth-order term of the variable H, a parameter (h2) is a coefficient of a second-order term of the variable H, and a constant term Co is the exit pupil distance at the position at which the image height is zero (the position of the optical axis OA1 on the imaging surface 22*a*). The parameters (h4) and (h2) and the constant term Co are information on the exit pupil distances according to different image heights, and are values determined according to the optical characteristics of the photographing optical system 31. The information which indicates the parameters (h4) and (h2) and the constant term Co is stored in the lens memory 33 as the above-described calculation information. The operation expression (1) is stored in the internal memory (or lens memory 33) of the lens control part 32.

The distance calculation part 35 calculates the exit pupil distance Po(H) with respect to the image height H of the set focus detection region 100 based on the image height H of the focus detection region 100 set by the region setting part 212, the calculation information (h4, h2, and Co), and the operation expression (1). The lens control part 32 generates information on the exit pupil distance Po(H) calculated by the distance calculation part 35 as information on the exit pupil distance (hereinafter referred to as exit pupil distance information). When a signal which instructs transmission of the exit pupil distance information is input from the camera body 2, the lens control part 32 transmits the exit pupil distance information generated based on the position information on the focus detection region 100 to the camera body 2. A method of obtaining the exit pupil distance at a specific image height is not limited to the method of obtaining the exit pupil distance using Equation (1). For example, instead of Equation (1), an operation expression using the cube of the image height can be used.

In the present embodiment, the body control part 210 is also an output part 210 which outputs the position information on the position of the focus detection region 100 to the interchangeable lens 3, and the lens control part 32 is also an input part 32 to which the position information on the position of the focus detection region 100 is input from the camera body 2. Further, the lens control part 32 is also an output part 32 which outputs the exit pupil distance information based on the position information to the camera body 2, and the body control part 210 is also an input part 210 to which the information on the exit pupil distance of the photographing optical system 31 is input from the interchangeable lens 3.

The selection part 214 selects whether the focus detection is performed using the first and second signals Sig1 and Sig2 output from an AF pixel pair among the plurality of types of AF pixel pairs provided in the imaging element 22. In the present embodiment, the selection part 214 selects one type of AF pixel pair among the plurality of types of AF pixel pairs disposed in the focus detection region 100 set by the region setting part 212. As will be described later, the selection part 214 selects an AF pixel pair suitable for the exit pupil distance Po(H) calculated by the distance calculation part 35 from the plurality of types of AF pixel pairs based on the exit pupil distance information input to the body control part 210. Further, when the plurality of focus detection regions 100 are set by the region setting part 212, the selection part 214 selects the same type of AF pixel pair in each of the set focus detection regions 100.

The focus detection part 215 performs focus detection processing necessary for automatic focus adjustment (AF) of the photographing optical system 31. The focus detection part 215 detects a focusing position (an amount of movement of the focus lens 31*b* to the focusing position) of the focus lens 31*b* for focusing (imaging) an image produced by the photographing optical system 31 on the imaging surface 22*a* of the imaging element 22. The focus detection part 215 calculates the amount of defocus with a pupil division type phase difference detection method using the first and second signals Sig1 and Sig2 output from the AF pixel pair selected by the selection part 214.

The focus detection part 215 performs a correlation calculation between the first signal Sig1 generated by imaging an image of a first luminous flux passing through a first pupil region of the exit pupil of the photographing optical system 31 and the second signal Sig2 generated by imaging an image of a second luminous flux passing through a second pupil region and calculates an image amount of deviation. The focus detection part 215 converts the amount of image deviation into the amount of defocus based on a predetermined conversion expression. The focus detection part 215 calculates an amount of movement of the focus lens 31*b* to the focusing position based on the calculated amount of defocus.

The focus detection part 215 determines whether or not the amount of defocus is within an allowable value. The focus detection part 215 determines that the focusing is achieved when the amount of defocus is within the allowable value. On the other hand, when the amount of defocus exceeds the allowable value, the focus detection part 215 determines that the focusing is not achieved and transmits a signal with instructions on the amount of movement of the focus lens 31*b* and the movement of the lens to the lens control part 32 of the interchangeable lens 3. The focus adjustment is automatically performed by the lens control part 32 moving the focus lens 31*b* according to the amount of movement.

Further, the focus detection part 215 can also perform focus detection processing of a contrast detection type in addition to the focus detection processing of the phase difference detection type. The body control part 210 sequentially calculates a contrast evaluation value of the subject image based on the signal output from the imaging pixel while moving the focus lens 31*b* of the photographing optical system 31 in the direction of the optical axis OA1. The body control part 210 associates the position of the focus lens 31*b* with the contrast evaluation value using the information which indicates the position of the focus lens 31*b* transmitted from the interchangeable lens 3. Then, the body control part 210 detects the position of the focus lens 31*b* which shows a peak value, that is, a maximum value of the contrast evaluation value, as the focusing position. The body control part 210 transmits information on the position of the focus lens 31*b* corresponding to the detected focusing position to the lens control part 32. The lens control part 32 moves the focus lens 31*b* to the focusing position and adjusts the focus.

Figure 3:
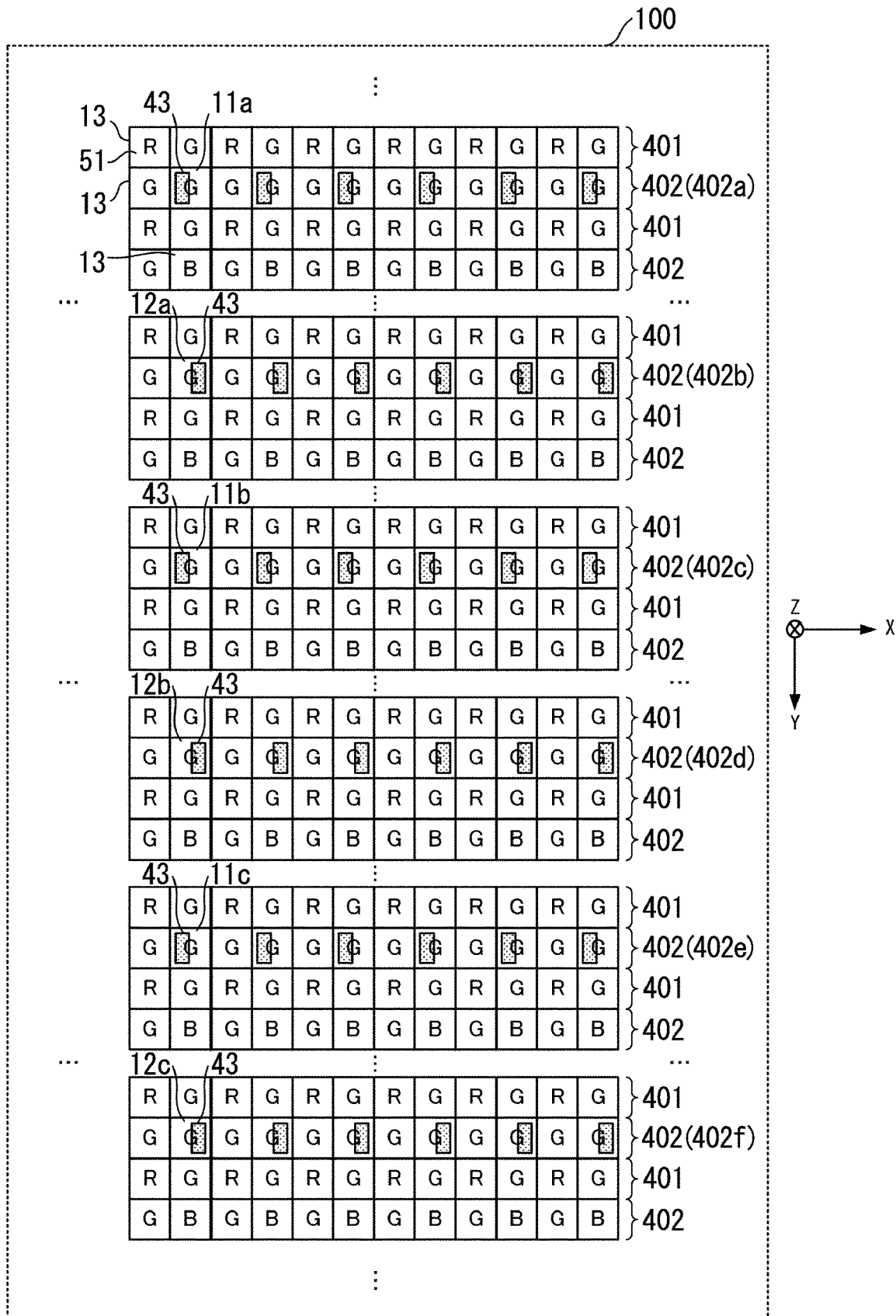
FIG. 3 is a diagram showing an example of pixel arrangement in the focus detection region of the imaging device according to the first embodiment.

FIG. 3 is a diagram showing an example of arrangement of pixels in the focus detection region 100. In FIG. 3, a first pixel group 401 in which the R pixels 13 and the G pixels 13 are alternately disposed in a X direction, that is, the row direction, and a second pixel group 402 in which the G pixels 13 and the B pixels 13 are alternately disposed in the row direction are alternately disposed in a ±Y direction, that is, in the column direction. The imaging pixels 13 are disposed according to the Bayer array.

Part of the second pixel groups 402 among the plurality of second pixel groups 402 include the first or second focus detection pixels 11 or 12. Each of the first and second focus detection pixels 11 and 12 has a light-shielding part 43. In FIG. 3, the second pixel groups 402 including the first focus detection pixels 11 are indicated by second pixel groups 402a, 402c, and 402e, and the second pixel groups 402 including the second focus detection pixels 12 are indicated by second pixel groups 402b, 402d, and 402f. The second pixel groups 402a, 402c, and 402e which include the first focus detection pixels 11 and the second pixel groups 402b, 402d, and 402f which include the second focus detection pixels 12 will be described below.

In the second pixel group 402a, the B pixel 13 is replaced with a first focus detection pixel 11a. In the second pixel group 402a, the first focus detection pixels 11a and the G pixels 13 are alternately disposed. A photoelectrical conversion part of the first focus detection pixel 11a receives a luminous flux which has passed through one of the first and second pupil regions of the exit pupil of the photographing optical system 31. The light-shielding part of the first focus detection pixel 11a blocks the luminous flux which has passed through the other one of the first and second pupil regions of the exit pupil of the photographing optical system 31. In the following description, it is assumed that the photoelectrical conversion part of the first focus detection pixel 11a receives the luminous flux which has passed through the first pupil region of the exit pupil of the photographing optical system 31. The light-shielding part of the first focus detection pixel 11a blocks the luminous flux which has passed through the second pupil region of the exit pupil of the photographing optical system 31.

In the second pixel group 402b which is separated from the second pixel group 402a by a predetermined row, the B pixel 13 is replaced with a second focus detection pixel 12a. In the second pixel group 402b, the second focus detection pixels 12a and the G pixels 13 are alternately disposed. A photoelectrical conversion part of the second focus detection pixel 12a receives a luminous flux which has passed through a pupil region of an exit pupil different from that of the first focus detection pixel 11a. The light-shielding part of the second focus detection pixel 11a blocks the luminous flux which has passed through the pupil region of the exit pupil which is different from that of the first focus detection pixel 11a. In the following description, it is assumed that the photoelectrical conversion part of the second focus detection pixel 12a receives the luminous flux which has passed through the second pupil region of the exit pupil of the photographing optical system 31. The light-shielding part of the second focus detection pixel 12a blocks the luminous flux which has passed through the first pupil region of the exit pupil of the photographing optical system 31.

An arrangement position of the first focus detection pixel 11a in the second pixel group 402a and an arrangement position of the second focus detection pixel 12a in the second pixel group 402b are the same as each other. That is, the first focus detection pixel 11a and the second focus detection pixel 12a are disposed in the same row.

The first focus detection pixel 11a of the second pixel group 402a and the second focus detection pixel 12a of the second pixel group 402b constitute the first AF pixel pair. The second pixel group 402a and the second pixel group 402b may be disposed in a plurality of rows, and a plurality of first AF pixel pairs may be disposed.

In the second pixel group 402c which is separated from the second pixel group 402b by a predetermined row, the B pixel 13 is replaced with a first focus detection pixel 11b. In the second pixel group 402c, the first focus detection pixels 11b and the G pixels 13 are alternately disposed. As in the first focus detection pixel 11a, a photoelectrical conversion part of the first focus detection pixel 11b receives a luminous flux which has passed through the first pupil region of the exit pupil of the photographing optical system 31. As in the first focus detection pixel 11a, a light-shielding part of the first focus detection pixel 11b blocks the luminous flux which has passed through the second pupil region of the exit pupil of the photographing optical system 31.

In the second pixel group 402d which is separated from the second pixel group 402c by a predetermined row, the B pixel 13 is replaced with a second focus detection pixel 12b. In the second pixel group 402d, the second focus detection pixels 12b and the G pixel 13 are alternately disposed. A photoelectrical conversion part of the second focus detection pixel 12b receives the luminous flux which has passed through the second pupil region of the exit pupil of the photographing optical system 31, as in the second focus detection pixel 12a. As in the second focus detection pixel 12a, a light-shielding part of the second focus detection pixel 12b blocks the luminous flux which has passed through the first pupil region of the exit pupil of the photographing optical system 31.

The arrangement position of the first focus detection pixel 11b in the second pixel group 402c and the arrangement position of the second focus detection pixel 12b in the second pixel group 402d are the same as each other. That is, the first focus detection pixel 11b and the second focus detection pixel 12b are disposed in the same row.

The first focus detection pixel 11b of the second pixel group 402c and the second focus detection pixel 12b of the second pixel group 402d constitute the second AF pixel pair. The second pixel group 402c and the second pixel group 402d may be disposed in a plurality of rows, and a plurality of second AF pixel pairs may be disposed.

In the second pixel group 402e which is separated from the second pixel group 402d by a predetermined row, the B pixel 13 is replaced with a first focus detection pixel 11c. In the second pixel group 402e, the first focus detection pixels 11c and the G pixels 13 are alternately disposed. A photoelectrical conversion part of the first focus detection pixel 11c receives the luminous flux which has passed through the first pupil region of the exit pupil of the photographing optical system 31, as in the first focus detection pixels 11a and 11b. As in the first focus detection pixels 11a and 11b, a light-shielding part of the first focus detection pixel 11c blocks the luminous flux which has passed through the second pupil region of the exit pupil of the photographing optical system 31.

In the second pixel group 402f which is separated from the second pixel group 402e by a predetermined row, the B pixel 13 is replaced with a second focus detection pixel 12c. In the second pixel group 402f, the second focus detection pixels 12c and the G pixels 13 are alternately disposed. A photoelectrical conversion part of the second focus detection pixel 12c receives the luminous flux which has passed through the second pupil region of the exit pupil of the photographing optical system 31. As in the second focus detection pixels 12a and 12b, the light-shielding part of the second focus detection pixel 12c blocks the luminous flux which has passed through the first pupil region of the exit pupil of the photographing optical system 31.

The arrangement position of the first focus detection pixel 11c in the second pixel group 402e and the arrangement position of the second focus detection pixel 12c in the second pixel group 402f are the same as each other. That is, the first focus detection pixel 11c and the second focus detection pixel 12c are disposed in the same row.

The first focus detection pixel 11c of the second pixel group 402e and the second focus detection pixel 12c of the second pixel group 402f constitute the third AF pixel pair. The second pixel group 402e and the second pixel group 402f may be disposed in a plurality of rows, and a plurality of third AF pixel pairs may be disposed.

An area of the light-shielding part 43 of each of the first AF pixel pair, the second AF pixel pair, and the third AF pixel pair is different except for the pixel pair around the optical axis OA1 (the center of the imaging surface 22a) of the photographing optical system 31. When the exit pupil distance is different, an angle of incidence of the light which is incident on the focus detection pixel differs except for the focus detection pixel around the optical axis OA1 of the photographing optical system 31. The angle of incidence increases as the exit pupil distance decreases, and the angle of incidence decreases as the exit pupil distance increases. In order to block some of the light incident at an angle of incidence which differs according to the exit pupil distance, the area of the light-shielding part 43 differs according to the AF pixel pair. Thus, the focus detection part 215 can accurately detect the amount of defocus even at different exit pupil distances. However, the angle of incidence of the pixel pair around the optical axis OA1 (the center of the imaging surface 22a) of the photographing optical system 31 is 0° regardless of the exit pupil distance. Therefore, the area of the light-shielding part 43 of each of the first AF pixel pair, the second AF pixel pair, and the third AF pixel pair is the same. As will be described later, the area of the light-shielding part 43 also differs according to the position (the image height) of the focus detection pixel.

In the present embodiment, each of the first focus detection pixels 11a, 11b, and 11c and the second focus detection pixels 12a, 12b, and 12c has a filter having spectral characteristics which spectrally disperses light of the second wavelength region (the green (G) light) in the incident light. The filter included in each of the first focus detection pixels 11a to 11c and the second focus detection pixels 12a to 12c may be a filter having spectral characteristics which spectrally disperses light of the first wavelength region (the red (R) light) or light of the third wavelength region (the blue (B) light). Further, the first focus detection pixels 11a to 11c and the second focus detection pixels 12a to 12c may have a filter having spectral characteristics which spectrally disperses the light of the first, second and third wavelength regions in the incident light.

Figure 4:
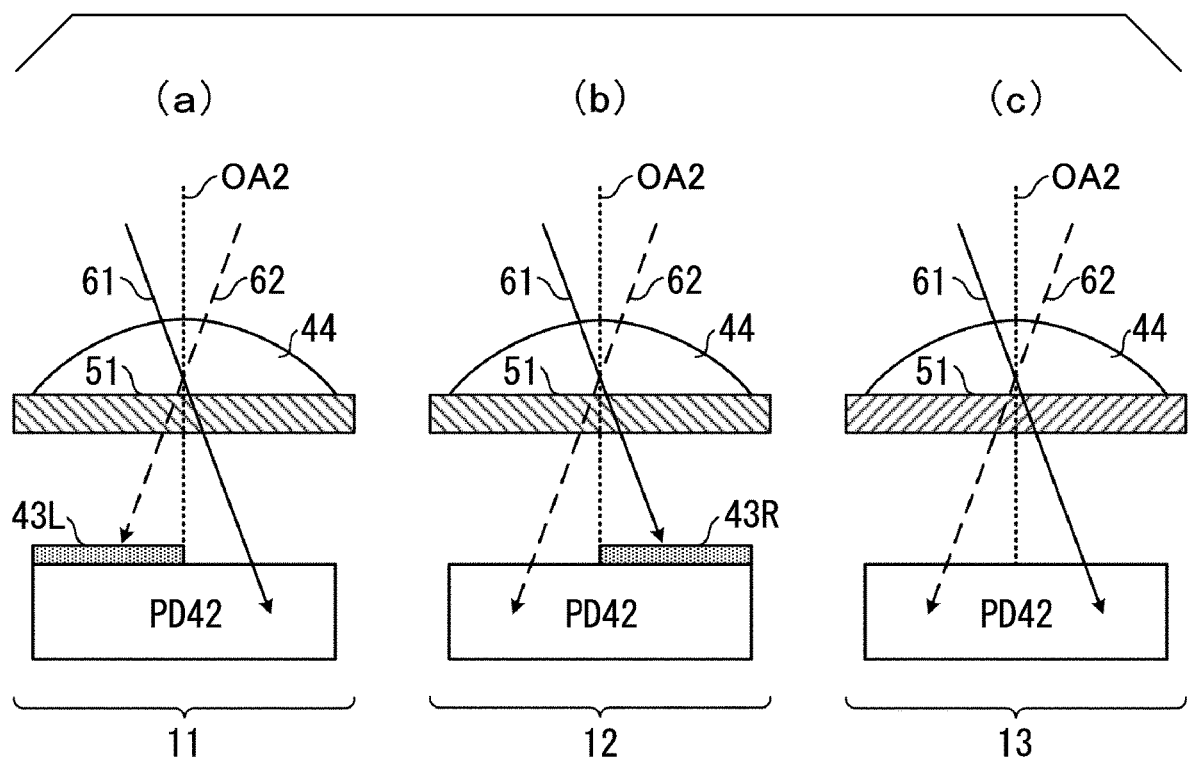
FIG. 4 is a diagram showing a constitution example of pixels in the imaging device according to the first embodiment.
Figure 4:
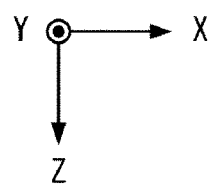

FIG. 4 is a diagram for explaining a constitution example of the focus detection pixel and the imaging pixel provided in the imaging element 22 according to the first embodiment. FIG. 4(a) shows an example of a cross section of the first focus detection pixel 11 of the first and second focus detection pixels 11 and 12 constituting the AF pixel pair, and FIG. 4(b) shows an example of a cross section of the second focus detection pixel 12 of the first and second focus detection pixels 11 and 12. FIG. 4(c) shows an example of a cross section of the imaging pixel 13 (the R pixel, the G pixel, and the B pixel).

In FIG. 4, all the first and second focus detection pixels 11 and 12 and the imaging pixel 13 have a micro-lens 44, a color filter 51, and a photoelectrical conversion part 42 (PD42) which performs photoelectrical conversion of the light transmitted (passed) through the micro-lens 44 and the color filter 51. A first luminous flux 61 is a luminous flux which has passed through the first pupil region that substantially bisects the exit pupil of the photographing optical system 31. A second luminous flux 62 is a luminous flux which has passed through the second pupil region that substantially bisects the exit pupil of the photographing optical system 31.

In FIG. 4(a), a light-shielding part 43L which blocks the second luminous flux 62 of the first and second luminous fluxes 61 and 62 is provided at the first focus detection pixel 11. The light-shielding part 43L is located between the color filter 51 and the photoelectrical conversion part 42 and is provided above the photoelectrical conversion part 42. In the example shown in FIG. 4(a), the light-shielding part 43L is disposed to block a left half (the −X direction side) of the photoelectrical conversion part 42 from light. A right end (an end in the +X direction) of the light-shielding part 43L substantially coincides with a center line which bisects the photoelectrical conversion part 42 to the left and right. The photoelectrical conversion part 42 of the first focus detection pixel 11 receives the first luminous flux 61. The photoelectrical conversion part 42 of the first focus detection pixel 11 performs the photoelectrical conversion of the first luminous flux 61 to generate an electric charge, and the first focus detection pixel 11 outputs the first signal Sig1 based on the electric charge generated by the photoelectrical conversion part 42.

An area of the light-shielding part 43L differs according to the position (the image height) of the first focus detection pixel 11, except for the first focus detection pixel 11 around the optical axis OA1 (the center of the imaging surface 22a) of the photographing optical system 31. When the position of the first focus detection pixel 11 differs, that is, the image height differs, the angle of incidence of the light incident on the first focus detection pixel 11 differs. When the image height becomes higher, the angle of incidence is larger, when the image height becomes lower, the angle of incidence is smaller, and when the image height is 0, the angle of incidence is 0°. The area of the light-shielding part 43L differs according to the image height to block the second luminous flux 62 in the light incident at an angle of incidence which differs according to the image height.

In FIG. 4(b), a light-shielding part 43R which blocks the first luminous flux 61 of the first and second luminous fluxes 61 and 62 is provided at the second focus detection pixel 12. The light-shielding part 43R is located between the color filter 51 and the photoelectrical conversion part 42 and is provided above the photoelectrical conversion part 42. In the example shown in FIG. 4(b), the light-shielding part 43R is disposed to block the light from a right half (the +X direction side) of the photoelectrical conversion part 42. A left end (an end in the −X direction) of the light-shielding part 43R substantially coincides with a center line which bisects the photoelectrical conversion part 42 into left and right. The photoelectrical conversion part 42 of the second focus detection pixel 12 receives the second luminous flux 62. The photoelectrical conversion part 42 of the second focus detection pixel 12 performs the photoelectrical conversion of the second luminous flux 62 to generate an electric charge, and the second focus detection pixel 12 outputs the second signal Sig2 based on the electric charge generated by the photoelectrical conversion part 42.

As in the first focus detection pixel 11, the area of the light-shielding part 43R differs according to the position (the image height) of the second focus detection pixel 12, except for the second focus detection pixel 12 around the optical axis OA1 (the center of the imaging surface 22a) of the photographing optical system 31. The area of the light-shielding part 43R differs according to the image height to block the first luminous flux 61 of the light incident at an angle of incidence which differs according to the image height.

In FIG. 4(c), the photoelectrical conversion part 42 of the imaging pixel 13 receives the first and second luminous fluxes 61 and 62 which have passed through the first and second pupil regions of the exit pupil of the photographing optical system 31. The photoelectrical conversion part 42 of the imaging pixel 13 performs the photoelectrical conversion of the first and second luminous fluxes 61 and 62 to generate an electric charge, and the imaging pixel 13 outputs a signal based on the electric charge generated by the photoelectrical conversion part 42.

Figure 5:
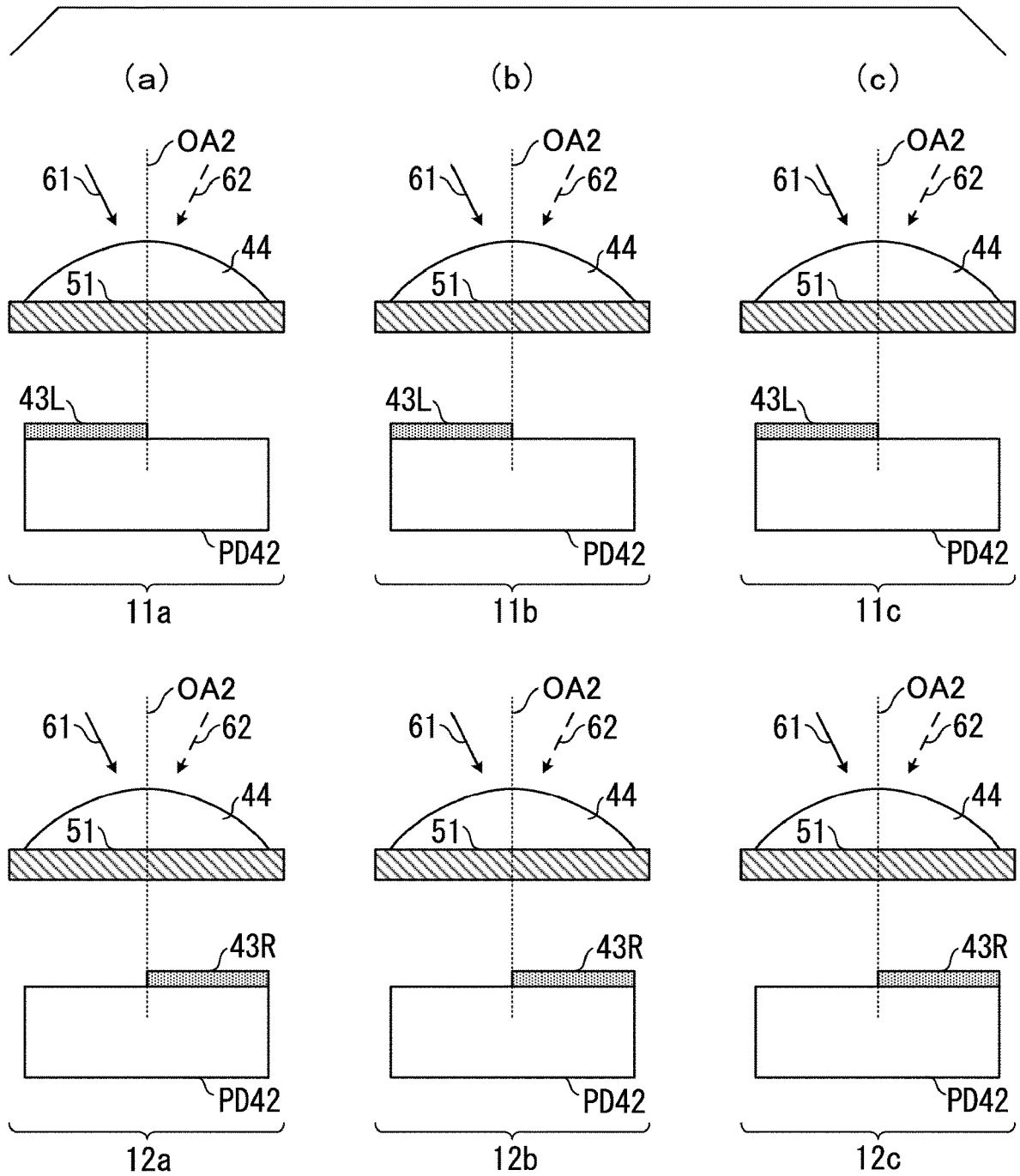
FIG. 5 is a cross-sectional view showing three types of AF pixel pairs disposed in a central region in the imaging device according to the first embodiment.

FIG. 5 is a cross-sectional view of three types of AF pixel pairs disposed in the small region 110a (refer to FIG. 2(b)) within the focus detection region 100a. FIG. 5(a) shows the first and second focus detection pixels 11a and 12a constituting the first AF pixel pair disposed in the second pixel groups 402a and 402b of FIG. 3. FIG. 5(b) shows the first and second focus detection pixels 11b and 12b constituting the second AF pixel pair disposed in the second pixel groups 402c and 402d of FIG. 3. FIG. 5(c) shows the first and second focus detection pixels 11c and 12c constituting the third AF pixel pair disposed in the second pixel groups 402e and 402f of FIG. 3. As shown in FIG. 5, in each of the first focus detection pixels 11a to 11c and the second focus detection pixels 12a to 12c, a line which passes through the center of the photoelectrical conversion part 42 and an optical axis OA2 of the micro-lens 44 substantially coincide with each other. The light incident on the optical axis OA2 of the micro-lens 44 at an angle of incidence of 0° is focused on the optical axis OA2 of the micro-lens. When the line passing through the center of the photoelectrical conversion part 42 coincides with the optical axis OA2 of the micro-lens 44, the light incident on the micro-lens 44 is focused on a line which passes through the center of the photoelectrical conversion part 42. That is, the light transmitted through the photographing optical system 31 is focused on the line which passes through the center of the photoelectrical conversion part 42.

In FIG. 5(a), in the first focus detection pixel 11a, the right end (an end in the +X direction) of the light-shielding part 43L substantially coincides with the optical axis OA2 of the micro-lens 44. The light-shielding part 43L of the first focus detection pixel 11a shields the left half (the −X direction side) of the photoelectrical conversion part 42 from light. The second luminous flux 62 transmitted through the micro-lens 44 is blocked by the light-shielding part 43L before it is incident on the photoelectrical conversion part 42. Thus, the photoelectrical conversion part 42 of the first focus detection pixel 11a receives the first luminous flux 61. In the second focus detection pixel 12a, a left end (an end in the −X direction) of the light-shielding part 43R substantially coincides with the optical axis OA2 of the micro-lens 44. The first luminous flux 61 transmitted through the micro-lens 44 is blocked by the light-shielding part 43R before it is incident on the photoelectrical conversion part 42. Thus, the photoelectrical conversion part 42 of the second focus detection pixel 12a receives the second luminous flux 62.

As shown in FIGS. 5(b) and 5(c), in each of the first focus detection pixels 11b and 11c, the right end (the end in the +X direction) of the light-shielding part 43L substantially coincides with the optical axis OA2 of the micro-lens 44. Therefore, as in the first focus detection pixel 11a, the photoelectrical conversion part 42 of each of the first focus detection pixels 11b and 11c receives the first luminous flux 61. Further, in each of the second focus detection pixels 12b and 12c, the left end (the end in the −X direction) of the light-shielding part 43R substantially coincides with the optical axis OA2 of the micro-lens 44. Therefore, as in the first focus detection pixel 12a, the photoelectrical conversion part 42 of each of the second focus detection pixels 12b and 12c receives the second luminous flux 62.

Figure 6:
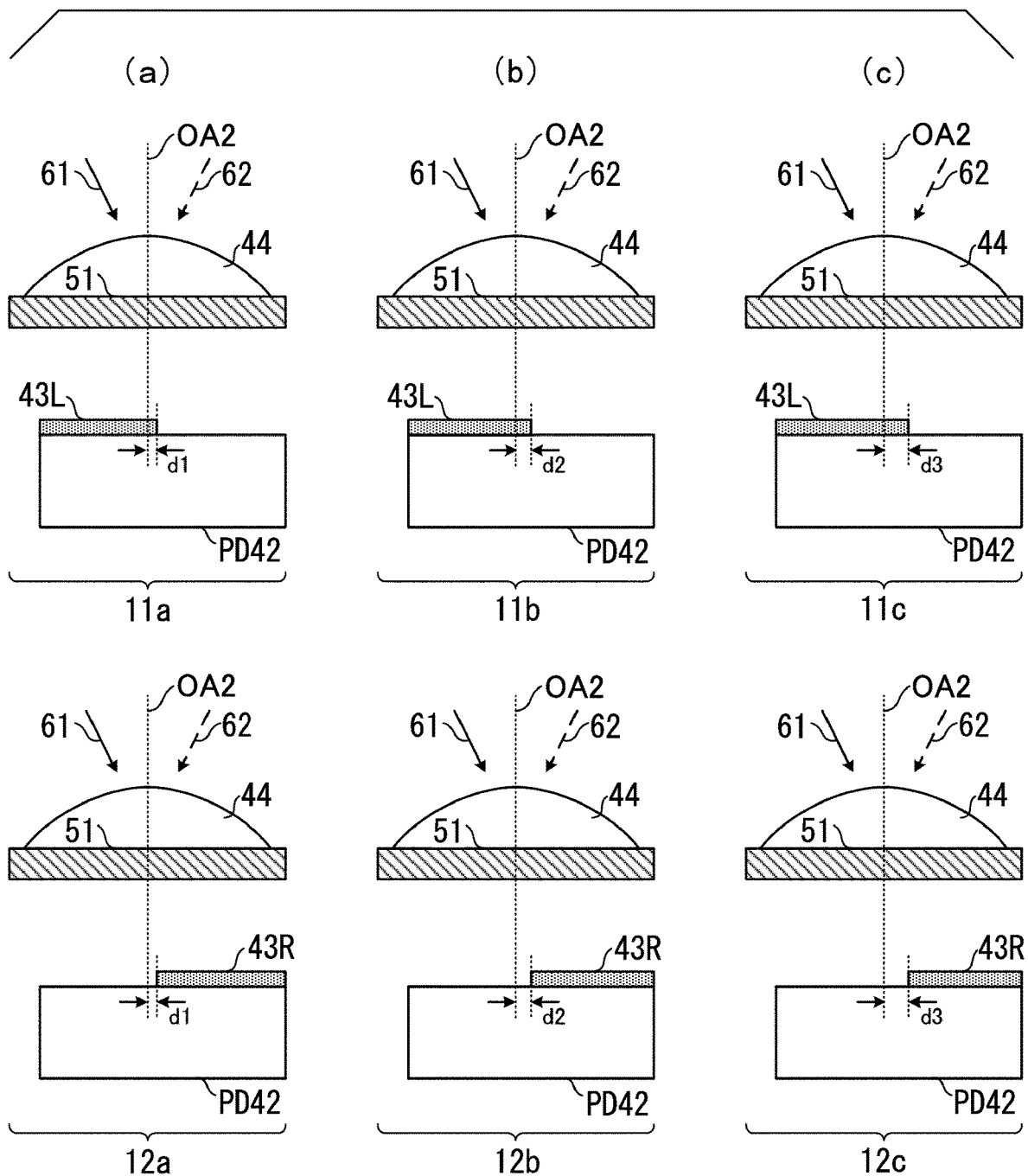
FIG. 6 is a cross-sectional view showing three types of AF pixel pairs disposed in a region of a predetermined image height position in the imaging device according to the first embodiment.

FIG. 6 is a cross-sectional view of three types of AF pixel pairs disposed in a small region 110c (refer to FIG. 2(b)) separated from the small region 110a in the focus detection region 100a in the +X direction. FIG. 6(a) shows the first and second focus detection pixels 11a and 12a constituting the first AF pixel pair. FIG. 6(b) shows the first and second focus detection pixels 11b and 12b constituting the second AF pixel pair. FIG. 6(c) shows the first and second focus detection pixels 11c and 12c constituting the third AF pixel pair.

In FIG. 6, in each of the first focus detection pixels 11a to 11c and the second focus detection pixels 12a to 12c, the line which passes through the center of the photoelectrical conversion part 42 deviates from the optical axis OA2 of the micro-lens 44 in the +X direction. In the present embodiment, in the first and second focus detection pixels disposed apart from the small region 110a in the +X direction, the line which passes through the center of the photoelectrical conversion part 42 deviates from the optical axis OA2 of the micro-lens 44 in the +X direction. Further, in the first and second focus detection pixels disposed apart from the small region 110a in the −X direction, the line which passes through the center of the photoelectrical conversion part 42 deviates from the optical axis OA2 of the micro-lens 44 in the −X direction.

Further, in FIG. 6, the area of the light-shielding part 43L of each of the first focus detection pixels 11a to 11c is different. The area of the light-shielding part 43L of the first focus detection pixel 11a is smaller than the area of the light-shielding part 43L of the first focus detection pixel 11b. The area of the light-shielding part 43L of the first focus detection pixel 11b is smaller than the area of the light-shielding part 43L of the first focus detection pixel 11c. The area of the light-shielding part 43R of each of the second focus detection pixels 12a to 12c is different. The area of the light-shielding part 43R of the second focus detection pixel 12a is larger than the area of the light-shielding part 43R of the second focus detection pixel 12b. The area of the light-shielding part 43R of the second focus detection pixel 12b is larger than the area of the light-shielding part 43R of the second focus detection pixel 12c.

In FIG. 6, since the line which passes through the center of the photoelectrical conversion part 42 and the optical axis OA2 of the micro-lens 44 deviate from each other, and the areas of the light-shielding parts 43 of the first and second focus detection pixels are different from each other, the ends of the light-shielding parts of the first and second focus detection pixels and the optical axis OA2 of the micro-lens 44 deviate from each other. In FIG. 6(a), for example, in the first focus detection pixel 11a, the right end (the end in the +X direction) of the light-shielding part 43L is located on the +X direction side from the optical axis OA2 of the micro-lens 44 by an amount of deviation d1. Further, in the second focus detection pixel 12a, the left end (the end in the −X direction) of the light-shielding part 43R is located on the +X direction side from the optical axis OA2 of the micro-lens 44 by the amount of deviation d1.

As shown in FIG. 6, the amount of deviation is different between the second and third AF pixel pairs and the first AF pixel pair. An amount of deviation d2 of the first and second focus detection pixels 11b and 12b constituting the second AF pixel pair is larger than the amount of deviation d1 of the first and second focus detection pixels 11a and 12a constituting the first AF image pair. An amount of deviation d3 of the first and second focus detection pixels 11c and 12c constituting the third AF pixel pair is larger than the amount of deviation d2 of the first and second focus detection pixels 11b and 12b constituting the second AF image pair. That is, d1<d2<d3.

Figure 2:
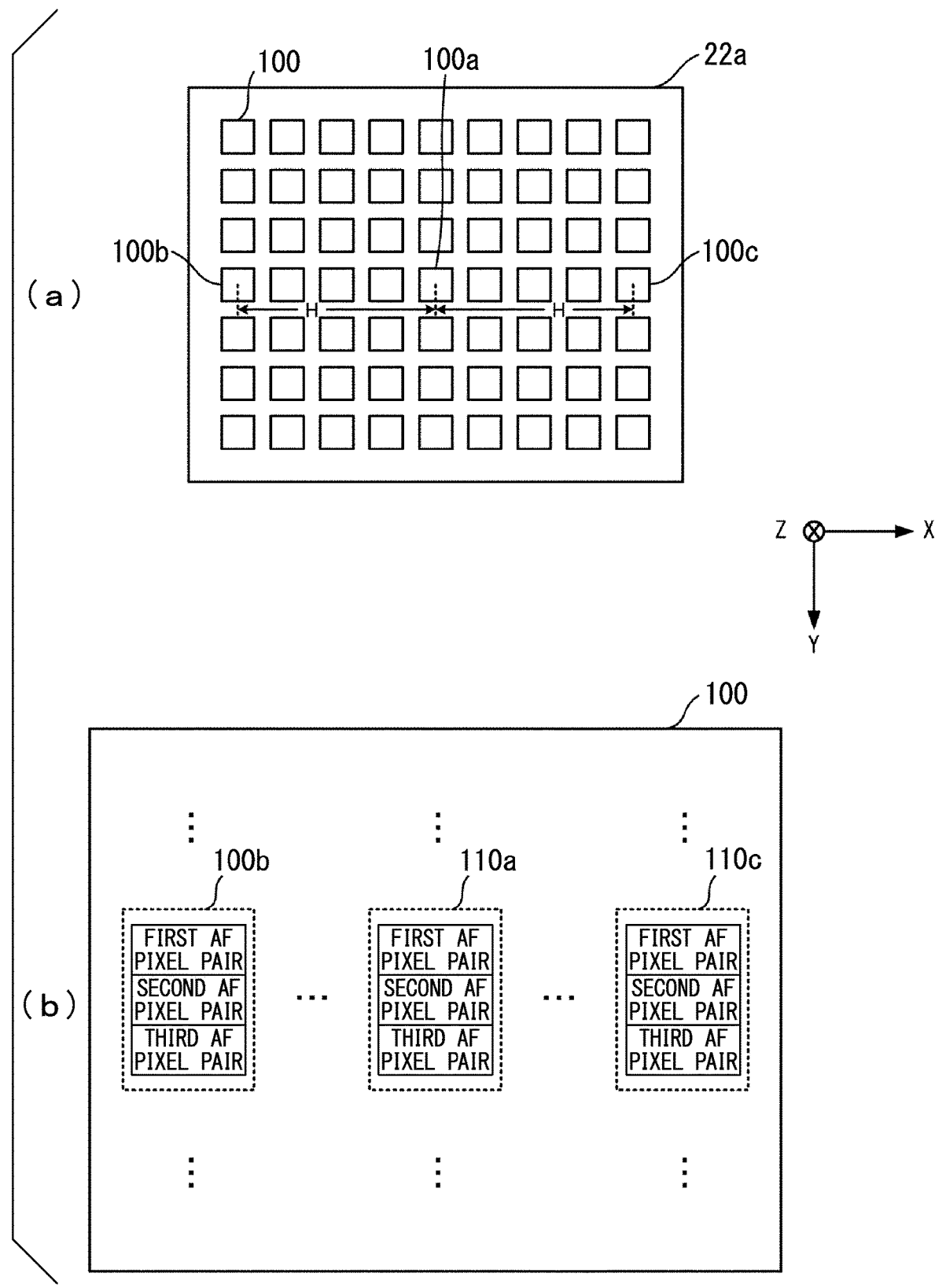
FIG. 2 is a diagram showing a focus detection region of an imaging surface of the imaging device according to the first embodiment.
Figure 7:
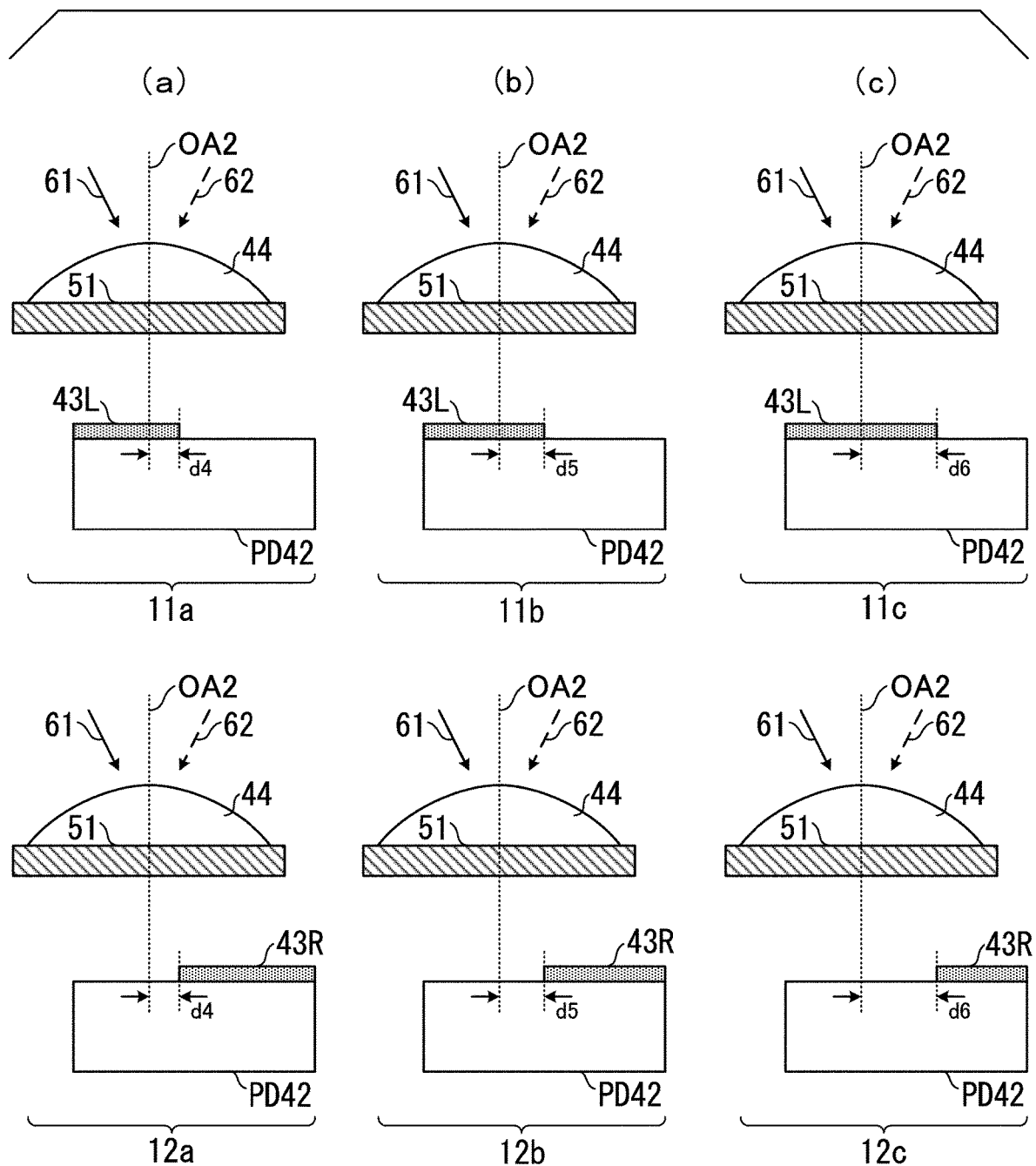
FIG. 7 is a cross-sectional view showing three types of AF pixel pairs disposed in a region of a predetermined image height position in the imaging device according to the first embodiment.

FIG. 7 is a cross-sectional view of part of the three types of AF pixel pairs in the focus detection region 100c separated from the focus detection region 100a of FIG. 2 in the +X direction. FIG. 7(a) shows the first and second focus detection pixels 11a and 12a constituting the first AF pixel pair. FIG. 7(b) shows the first and second focus detection pixels 11b and 12b constituting the second AF pixel pair. FIG. 7(c) shows the first and second focus detection pixels 11c and 12c constituting the third AF pixel pair.

As in the three types of AF pixel pairs shown in FIG. 6, in each of the first focus detection pixels 11a to 11c and the second focus detection pixels 12a to 12c shown in FIG. 7, the line which passes through the center of the photoelectrical conversion part 42 deviates from the optical axis OA2 of the micro-lens 44 in the +X direction. Further, as in the three types of AF pixel pairs shown in FIG. 6, the areas of the light-shielding parts 43L of the first focus detection pixels 11a to 11c are different from each other. The areas of the light-shielding part 43R of the second focus detection pixels 12a to 12c are different from each other.

The three types of AF pixel pairs shown in FIGS. 6 and 7 are different from each other in the amount of deviation of the line which passes through the center of the photoelectrical conversion part 42 with respect to the optical axis OA2 of the micro-lens 44. Further, except for the first focus detection pixel 11b and the second focus detection pixel 12b, the area of the light-shielding part 43L and the area of the light-shielding part 43R are different from each other. Compared with FIG. 6, the three types of AF pixel pairs shown in FIG. 7 have a large amount of deviation of the micro-lens 44 with respect to the optical axis OA2. Further, in the first focus detection pixel 11a and the second focus detection pixel 12a shown in FIG. 7, the area of the light-shielding part 43L is smaller and the area of the light-shielding part 43R is larger than those in FIG. 6. In the first focus detection pixel 11c and the second focus detection pixel 12c shown in FIG. 7, the area of the light-shielding part 43L is larger and the area of the light-shielding part 43R is smaller than those in FIG. 6. The first focus detection pixel 11b and the second focus detection pixel 12b shown in FIG. 7 have the same area as the light-shielding part 43L and have the same area as the light-shielding part 43R in FIG. 6.

In the first focus detection pixel 11a, the right end (the end in the +X direction) of the light-shielding part 43L deviates from the optical axis OA2 of the micro-lens 44 by the amount of deviation d4 in the +X direction. In the second focus detection pixel 12a, the left end (the end in the −X direction) of the light-shielding part 43R deviates from the optical axis OA2 of the micro-lens 44 by the amount of deviation d4 in the +X direction.

The amount of deviation is different between the second and third AF pixel pairs and the first AF pixel pair. An amount of deviation d5 of the first and second focus detection pixels 11b and 12b constituting the second AF pixel pair is larger than an amount of deviation d4 of the first and second focus detection pixels 11a and 12a constituting the first AF image pair. An amount of deviation d6 of the first and second focus detection pixels 11c and 12c constituting the third AF pixel pair is larger than the amount of deviation d5 of the first and second focus detection pixels 11b and 12b constituting the second AF image pair. That is, d4<d5<d6.

As shown in FIGS. 5, 6 and 7, the amount of deviation between the line passing through the center of the photoelectrical conversion part 42 and the optical axis OA2 of the micro-lens 44 differs according to the image height. As the image height becomes higher, the amount of deviation increases, and as the image height becomes lower, the amount of deviation decreases. At a position at which the image height is high, the light transmitted through the photographing optical system 31 is obliquely incident on the micro-lens 44. That is, the light is incident on the optical axis OA2 of the micro-lens 44 at an angle of incidence larger than 0°. Therefore, it can be said that, as the angle of incidence of light on the micro-lens 44 becomes larger, the amount of deviation increases. The light incident on the optical axis OA2 of the micro-lens 44 at an angle of incidence larger than 0° is focused in a state in which the light deviates from the optical axis OA2 of the micro-lens in the +X direction or the −X direction. The light incident on the micro-lens 44 is focused on the line passing through the center of the photoelectrical conversion part 42 by the line passing through the center of the photoelectrical conversion part 42 and the optical axis OA2 of the micro-lens 44 deviating from each other. That is, the light transmitted through the photographing optical system 31 is focused on the line passing through the center of the photoelectrical conversion part 42. As a result, an amount of light transmitted through the photographing optical system 31 and incident on the photoelectrical conversion part 42 can be increased.

As shown in FIGS. 5, 6 and 7, the area of the light-shielding part 43 differs according to the AF pixel pair. As described above, the exit pupil distance of the photographing optical system 31 differs according to the type of the interchangeable lens 3. Therefore, each of the first AF pixel pair, the second AF pixel pair, and the third AF pixel pair has the light-shielding part 43 having a different area to accurately detect the amount of defocus at different exit pupil distances. Further, the area of the light-shielding part 43L and the area of the light-shielding part 43R of the first AF pixel pair differ according to the position (the image height) at which the first AF pixel pair is disposed. As described above, the exit pupil distance of the photographing optical system 31 differs according to the image height. Therefore, the first AF pixel pair has the light-shielding part 43L and the light-shielding part 43R having an area which changes according to the image height to accurately detect the amount of defocus at different exit pupil distances. The third AF pixel pair is the same as the first AF pixel pair. Thus, the focus detection part 215 can accurately detect the amount of defocus even at different exit pupil distances. That is, the focus detection part 215 can accurately detect the amount of defocus even when the image height or the type of the interchangeable lens changes.

Therefore, the amount of deviation between the light-shielding parts 43 of the first to third AF pixel pairs and the optical axis of the micro-lens 44 increases as the image height increases in the +X direction from the small region 110a in FIG. 2(b). The amount of deviation in the first to third AF pixel pairs in the three regions in which the image heights are Ha, Hb, and He (Ha<Hb<Hc) can be compared as follows. The amount of deviation of the first AF pixel pair in the region of the image height Hb is larger than the amount of deviation of the first AF pixel pair in the region of the image height Ha, and is smaller than the amount of deviation of the first AF pixel pair in the region of the image height Hc. Similarly, the amounts of deviation of the second and third AF pixel pairs in the region of the image height Hb are larger than the amounts of deviation of the second and third AF pixel pairs in the region of the image height Ha and are smaller than the amount of deviation of the second and third AF pixel pairs in the region of the image height Hc. The amount of deviation d4 of the first AF pixel pair disposed in the focus detection region 100c shown in FIG. 7 is larger than the amount of deviation d1 of the first AF pixel pair disposed in the small region 110c shown in FIG. 6. The amounts of deviation d5 and d6 of the second and third AF pixel pairs disposed in the focus detection region 100c shown in FIG. 7 are larger than the amounts of deviation d2 and d3 of the second and third AF pixel pairs disposed in the small region 110c shown in FIG. 6.

In the first to third AF pixel pairs disposed in the small region 110b separated from the small region 110a in FIG. 2(b) in the −X direction, the amounts of deviation which are the same as the amounts of deviation d1 to d3 are given in a direction opposite to a deviation direction shown in FIG. 6. In the first to third AF pixel pairs disposed in the focus detection region 100b of FIG. 2(a), the amounts of deviation which are the same as the amounts of deviation d4 to d6 are given in a direction opposite to the deviation direction shown in FIG. 7. The amounts of deviation of the first to third AF pixel pairs disposed apart from the small region 110a in the −X direction also increase as the image height increases.

As described above, the first to third AF pixel pairs have different amounts of deviation. Therefore, on a surface which intersects a light incidence direction, areas in which the photoelectrical conversion parts 42 of the first focus detection pixels 11a to 11c receive light are different from each other, and areas in which the photoelectrical conversion parts 42 of the second focus detection pixels 12a to 12c receive light are different from each other. As described above, in the present embodiment, since the first to third AF pixel pairs have different light receiving areas of the photoelectrical conversion parts 42, pupil division corresponding to different angles of incidence can be performed. As a result, the focus detection part 215 can accurately detect the amount of defocus.

Figure 8:
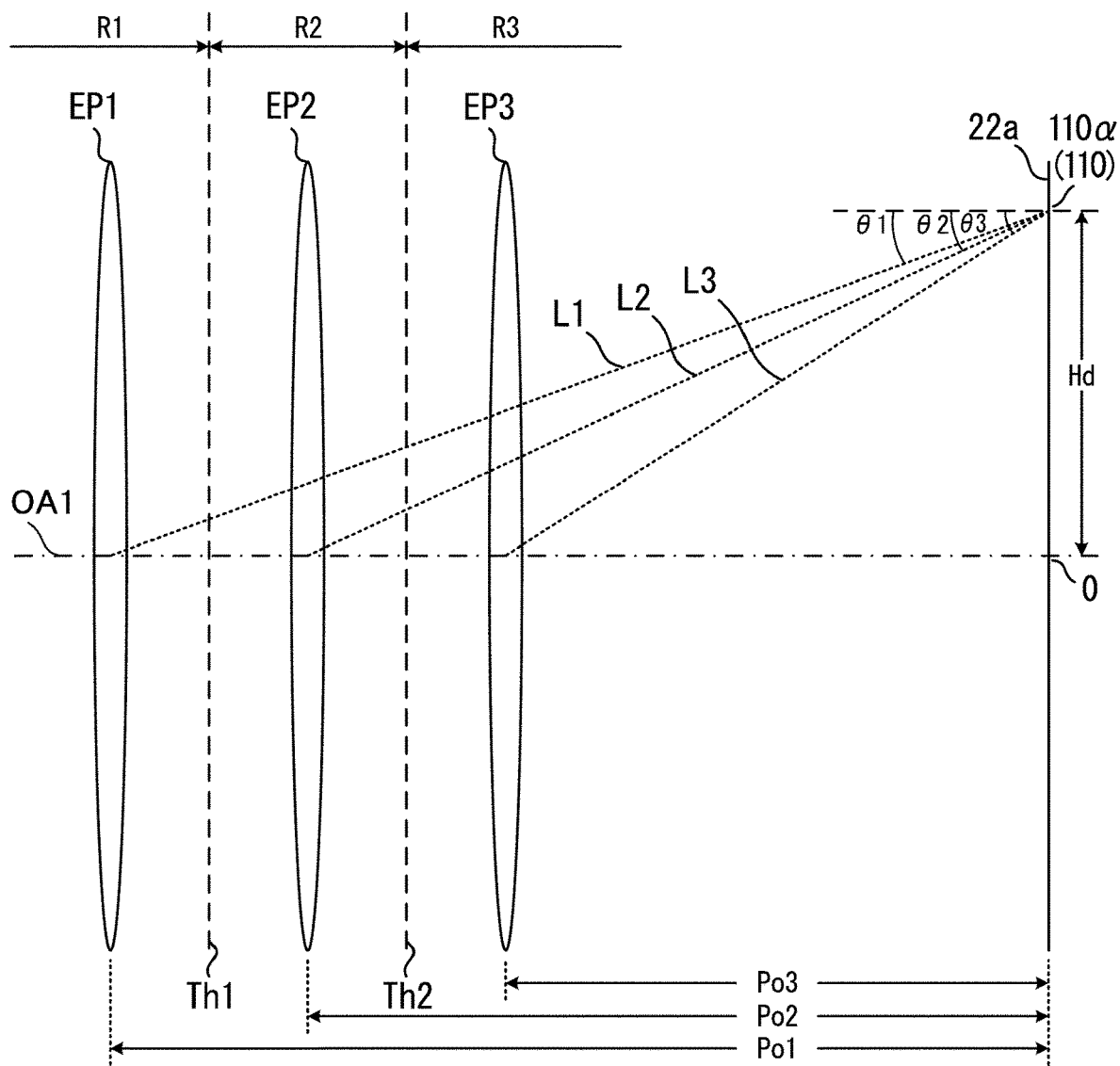
FIG. 8 is a diagram showing the relationship between a reference exit pupil and an image height in the imaging device according to the first embodiment.

Next, an example of a method of determining the amounts of deviation of the first to third AF pixel pairs in the focus detection region 100 will be described. In FIG. 8, the position of the small region 110 located at the image height Hd from a position 0 (a center position of the imaging surface 22a) at which the optical axis OA1 of the photographing optical system 31 intersects the imaging surface 22a of the imaging element 22 is designated by 110a. A first reference exit pupil EP1, a second reference exit pupil EP2, and a third reference exit pupil EP3 are set on the OA1 of the photographing optical system 31. The second reference exit pupil EP2 is located closer to the imaging surface 22a than the first reference exit pupil EP1 and is located on the +Z direction side with respect to the first reference exit pupil EP1. The third reference exit pupil EP3 is located closer to the imaging surface 22a than the second reference exit pupil EP2 and is located on the +Z direction side with respect to the second reference exit pupil EP2.

A distance between the first reference exit pupil EP1 and the imaging surface 22a is defined as a first reference exit pupil distance Po1, a distance between the second reference exit pupil EP2 and the imaging surface 22a is defined as a second reference exit pupil distance Po2, and a distance between the third reference exit pupil EP3 and the imaging surface 22a is defined as a third reference exit pupil distance Po3. However, Po1>Po2>Po3.

In FIG. 8, L1 indicates a main light ray of the luminous flux which passes through the first reference exit pupil EP1 and is incident on the focus detection pixel in the small region 110 located at the position 110a. L2 indicates a main light ray of the luminous flux which passes through the second reference exit pupil EP2 and is incident on the focus detection pixel in the small region 110 located at the position 110a. L3 indicates a main light ray of the luminous flux which passes through the third reference exit pupil EP3 and is incident on the focus detection pixel in the small region 110 located at the position 110a.

In FIG. 8, assuming that θ1 is an angle of incidence of the main light ray L1 on the focus detection pixel, the amount of deviation of the first AF pixel pair in the small region 110 of the image height Hd is determined based on the angle of incidence θ1. Similarly, assuming that θ2 and θ3 are angles of incidence of the main light rays L2 and L3 on the focus detection pixels, the amounts of deviation of the second and third AF pixel pairs in the small region 110 of the image height Hd are determined based on the angles of incidence θ2 and θ3. As described above, the amount of deviation increases as the angle of incidence increases. Further, except for the position at which the image height is 0 (the position 0), the angle of incidence becomes smaller as the exit pupil distance becomes longer, and thus θ1<θ2<θ3. Therefore, the amounts of deviation d1, d2, and d3 of the first, second, and third AF pixel pairs shown in FIGS. 6(a) to 6(c) are d1<d2<d3. Further, the amounts of deviation d4, d5, and d6 of the first, second, and third AF pixel pairs shown in FIGS. 7(a) to 7(c) are d4<d5<d6.

In this way, the amount of deviation of the first AF pixel pair with respect to the first reference exit pupil EP1 (the first reference exit pupil distance Po1) is determined. Similarly, the amount of deviation of the second AF pixel pair with respect to the second reference exit pupil EP2 (the second reference exit pupil distance Po2) is determined, and the amount of deviation of the third AF pixel pair with respect to the third reference exit pupil EP3 (the third reference exit pupil distance Po3) is determined.

Next, the relationship between the exit pupil distance of the photographing optical system 31 and the first to third AF pixel pairs will be described. In FIG. 8, a first threshold value Th1 with respect to the exit pupil distance is set at an intermediate position between the first reference exit pupil EP1 and the second reference exit pupil EP2, and a second threshold value Th2 with respect to the exit pupil distance is provided at an intermediate position between the second reference exit pupil EP2 and the third reference exit pupil EP3. A region in which the exit pupil distance is equal to or greater than the first threshold value Th1 is defined as a first exit pupil distance range R1, a region in which the exit pupil distance is between the first threshold value Th1 and the second threshold value Th2 is defined as a second exit pupil distance range R2, and a region in which the exit pupil distance is equal to or less than the second threshold value Th2 is defined as a third exit pupil distance range R3.

The selection part 214 selects the first AF pixel pair when the exit pupil distance of the photographing optical system 31 is equal to or greater than the first threshold value Th1, that is, when it belongs to the first exit pupil distance range R1. The selection part 214 selects the second AF pixel pair when the exit pupil distance of the photographing optical system 31 is between the first threshold value Th1 and the second threshold value Th2, that is, when it belongs to the second exit pupil distance range R2. The selection part 214 selects the third AF pixel pair when the exit pupil distance of the photographing optical system 31 is equal to or less than the second threshold value Th2, that is, when it belongs to the third exit pupil distance range R3.

As described above, the selection part 214 selects an appropriate AF pixel pair from the first to third AF pixel pairs according to any one of the first to third exit pupil distance ranges R1 to R3 to which the exit pupil distance of the photographing optical system belongs.

Figure 9:
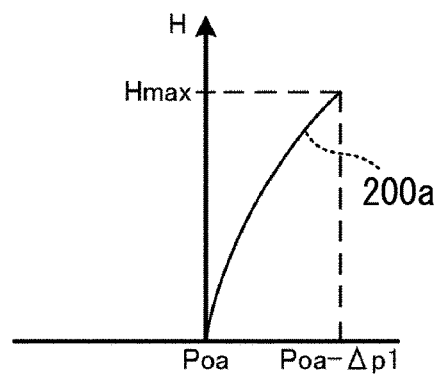
FIG. 9 shows various optical characteristics of an interchangeable lens in the imaging device according to the first embodiment in which an exit pupil distance changes according to the image height.
Figure 9:
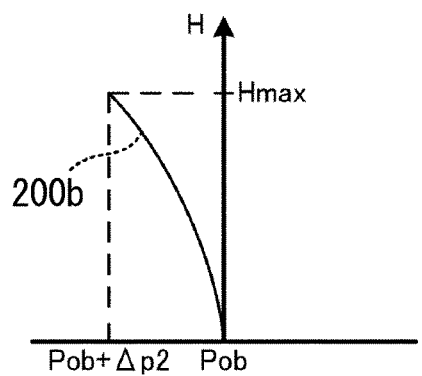
Figure 9:
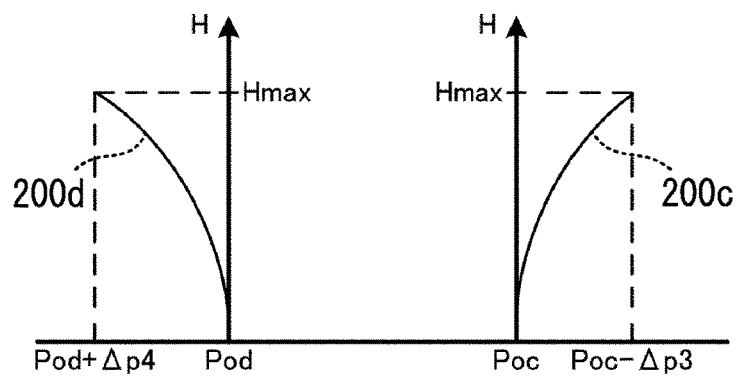
Figure 9:
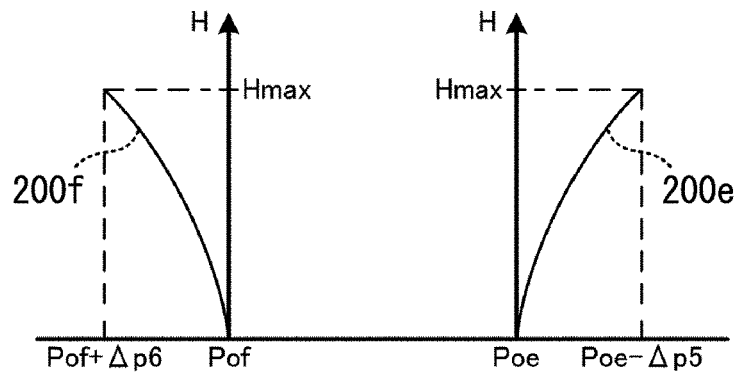

Next, the optical characteristics of the photographing optical system 31 of the interchangeable lens 3, that is, the optical characteristics in which the exit pupil distance thereof changes according to the image height will be described. FIG. 9 shows the optical characteristics of the interchangeable lens 3 mounted on the camera body 2 of FIG. 1 in which the exit pupil distance changes according to the image height. In FIG. 9, a horizontal axis indicates the exit pupil distance Po, and a vertical axis indicates the image height H. FIGS. 9(a), 9(b), 9(c), and 9(d) show the optical characteristics of different types of interchangeable lenses. The optical characteristics of the photographing optical system 31 of the interchangeable lens 3 shown in FIG. 9(a) are represented by an optical characteristic curve 200a, and the exit pupil distance Po decreases as the image height H increases. The optical characteristic curve 200a of FIG. 9(a) shows that the exit pupil distance is Poa at a zero-image height, the exit pupil distance gradually decreases as the image height H increases, and the exit pupil distance becomes (Poa−Δp1) at the maximum image height Hmax.

The optical characteristics of the photographing optical system 31 of the interchangeable lens 3 shown in FIG. 9(b) are represented by an optical characteristic curve 200b, and the exit pupil distance Po increases as the image height H increases.

The optical characteristic curve 200b of FIG. 9(b) shows that the exit pupil distance is Pob at the zero-image height, the exit pupil distance gradually increases as the image height H increases, and the exit pupil distance becomes (Pob+Δp2) at the maximum image height Hmax.

In the following description, like the optical characteristic curve 200a, an optical characteristic curve in which the exit pupil distance Po decreases as the image height H increases is referred to as a negative optical characteristic curve. Further, like the optical characteristic curve 200b, an optical characteristic curve in which the exit pupil distance Po also increases as the image height H increases is referred to as a positive optical characteristic curve.

In the photographing optical system 31 of the interchangeable lens 3 shown in FIG. 9(c), the optical characteristic curve thereof differs, that is, changes according to a position of the focus lens 31b in FIG. 1. The photographing optical system 31 exhibits an optical characteristic curve 200c when the focus lens 31b is located at a first position and exhibits an optical characteristic curve 200d when the focus lens 31b is located at a second position. The first and second positions of the focus lens 31b include the infinity position and the closest position of the focus lens 31b and are arbitrary positions between the infinity position and the closest position. The infinity position of the focus lens 31b is a position at which a subject at an infinity distance is in focus, and the closest position is a position at which a subject at a closest distance is in focus.

In FIG. 9(c), the optical characteristic curve 200c indicates the optical characteristics of the photographing optical system 31 when the focus lens 31b is located at the first position. The optical characteristic curve 200c indicates that the exit pupil distance is Poc at the zero-image height, the exit pupil distance gradually decreases as the image height H increases, and the exit pupil distance becomes (Poc−Δp3) at the maximum image height Hmax. The optical characteristic curve 200d indicates the optical characteristics of the photographing optical system 31 when the focus lens 31b is located at the second position. The optical characteristic curve 200d indicates that the exit pupil distance is Pod at the zero-image height, the exit pupil distance gradually increases as the image height H increases, and the exit pupil distance becomes (Pod+Δp4) at the maximum image height Hmax.

In FIG. 9(c), the optical characteristic curve 200c when the focus lens 31b is at the first position is shown as a negative optical characteristic curve, and the optical characteristic curve 200d when the focus lens 31b is at the second position is shown as a positive optical characteristic curve. However, there is also an interchangeable lens 3 having optical characteristics in which both the optical characteristic curve 200c and the optical characteristic curve 200d are positive or negative.

In the photographing optical system 31 of the interchangeable lens 3 shown in FIG. 9(d), the optical characteristic curve thereof differs, that is, changes according to the focus distance of the zoom lens (a position of the zoom lens 31a in FIG. 1). The photographing optical system 31 exhibits an optical characteristic curve 200e when the focus distance is f1 and exhibits an optical characteristic curve 200f when the focus distance is f2.

In FIG. 9(d), the optical characteristic curve 200e indicates the optical characteristics of the photographing optical system 31 when the focus distance is f1. The optical characteristic curve 200e indicates that the exit pupil distance is Poe at the zero-image height, the exit pupil distance gradually decreases as the image height H increases, and the exit pupil distance becomes (Poe−Δp5) at the maximum image height Hmax. The optical characteristic curve 200f indicates the optical characteristics of the photographing optical system 31 when the focus distance is f2. The optical characteristic curve 200f indicates that the exit pupil distance is Pof at the zero-image height, the exit pupil distance gradually increases as the image height H increases, and the exit pupil distance becomes (Pof+Δp6) at the maximum image height Hmax.

In FIG. 9(d), the optical characteristic curve 200e when the focus distance is f1 is shown as a negative optical characteristic curve, and the optical characteristic curve 200f when the focus distance is f2 is shown as a positive optical characteristic curve. However, there is also an interchangeable lens 3 having optical characteristics in which both the optical characteristic curve 200e and the optical characteristic curve 200f are positive or negative.

In the above-described description, the exit pupil distance Po at the image height H is the distance of the exit pupil of the photographing optical system 31 when seen from the image height H of the imaging surface 22a. In other words, the exit pupil distance Po at the image height H is a luminous flux which has passed through the photographing optical system 31 and is a distance (a distance from the imaging surface 22a) of the exit pupil of the photographing optical system 31 through which the luminous flux incident at a position of the image height H on the imaging surface 22a passes.

Figure 10:
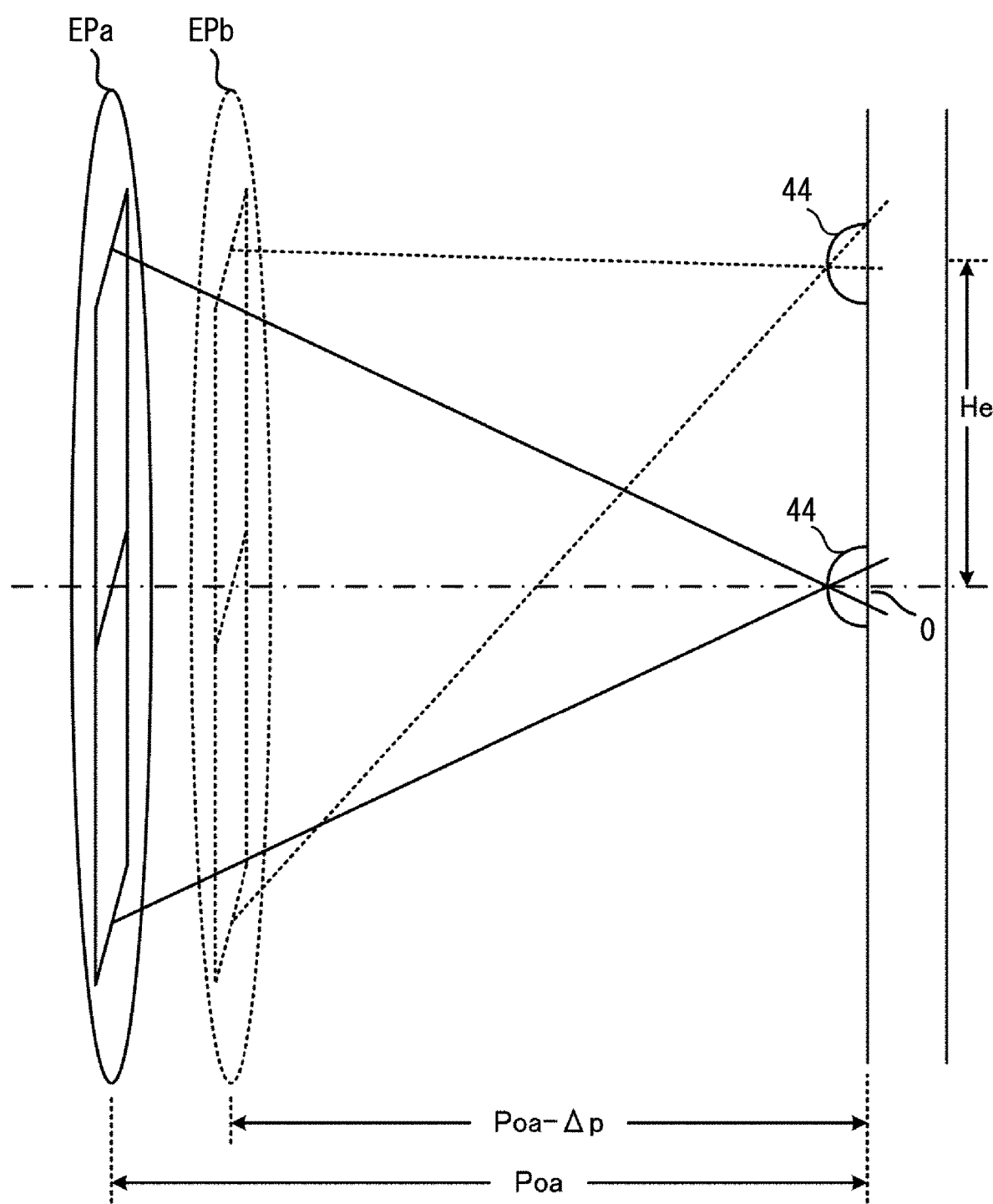
FIG. 10 is a diagram showing the relationship between the image height and the exit pupil in the imaging device according to the first embodiment.

FIG. 10 shows the relationship between the image height H and the exit pupil distance Po. In FIG. 10, a luminous flux which has passed through the exit pupil EPa (the exit pupil distance Poa) of the photographing optical system 31 is incident on the focus detection pixel (the micro-lens 44 is shown on behalf of the focus detection pixel in FIG. 10) located at the center position 0 (the zero-image height) of the imaging surface 22a. The exit pupil distance Poa of the exit pupil EPa is the exit pupil distance of the exit pupil EPa with respect to the zero-image height.

Further, a luminous flux which has passed through the exit pupil EPb of the photographing optical system 31 is incident on the focus detection pixel (the micro-lens 44 is shown on behalf of the focus detection pixel in FIG. 10) located at the image height He. The exit pupil distance (Poa−Δp) of the exit pupil EPb is the exit pupil distance of the exit pupil EPb with respect to the image height H.

Here, the relationship between the optical characteristics of each of the interchangeable lenses 3 and the above-described Equation (1) will be described. Equation (1) of $Po(H)=h4 \times H^4 + h2 \times H^2 + Co$ is a function which approximates the optical characteristic curves 200a, 200b, 200c, 200d, 200e, 200f, and the like shown in FIGS. 9(a) to 9(d). The optical characteristic curve 200a of FIG. 9(a) is approximated by the calculation of Equation (1) by setting the constant term Co of the operation expression (1) to the exit pupil distance Poa at the zero-image height of FIG. 9(a), and setting the coefficients h4 and h2 to coefficients h4a and h2a corresponding to a curve of the optical characteristic curve 200a. As described above, the interchangeable lens 3 having the optical characteristics of FIG. 9(a) stores the constant terms Poa and the coefficients h4a and h2a in the lens memory 33 as calculation information.

Similarly, the interchangeable lens 3 having the optical characteristics of FIG. 9(b) stores the constant term Pob and the coefficients h4b and h2b which identify the calculation of Equation (1) which approximates the optical characteristic curve 200b in the lens memory 33 as calculation information.

Further, the interchangeable lens 3 of FIG. 9(c) has an optical characteristic in which the optical characteristic curve changes according to the position of the focus lens 31b. The interchangeable lens 3 stores in the lens memory 33 the constant terms Co and the coefficients h4 and h2 of the calculation of Equation (1) which approximate the optical characteristic curve for each of the positions of the focus lens 31b. A range in which the focus lens 31b moves (between the infinity position and the closest position) is divided into a plurality of sections Z1 to Zn, and one optical characteristic curve representing the section (the range) is determined for each of the sections Z1 to Zn. For example, the optical characteristic curve when the focus lens 31b is located at a center position of one section is defined as the optical characteristic curve representing the section.

Figures 11, 12, 13:
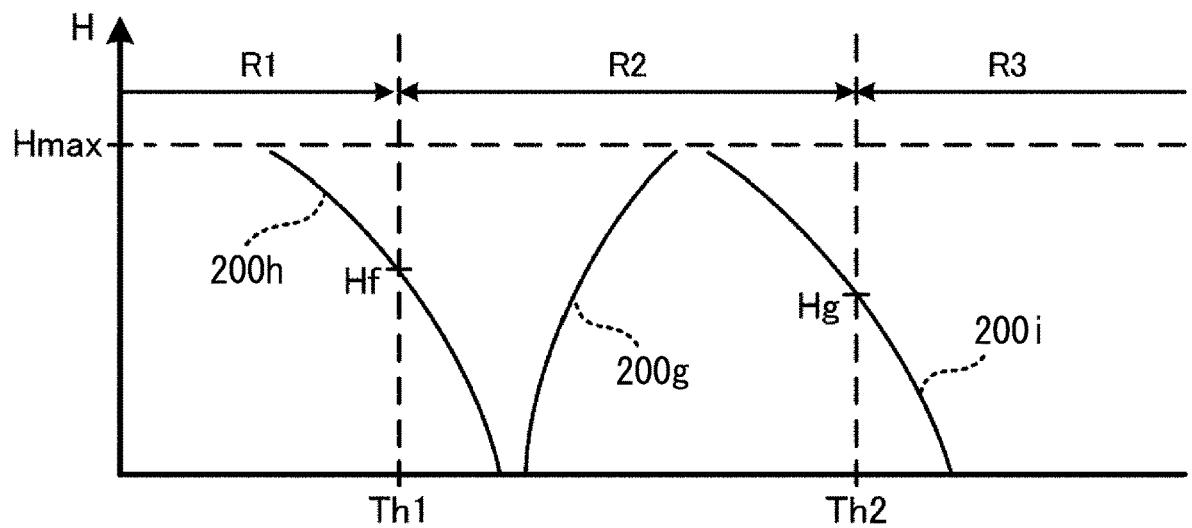
FIG. 11 is a table showing a constant term and a coefficient of a function which approximates a focus position section and a representative optical characteristic curve of the focus position section in the imaging device according to the first embodiment.
FIG. 12 is a table showing a constant term and a coefficient of a function which approximates a section and a representative optical characteristic curve of the section in the imaging device according to the first embodiment.
FIG. 13 is a diagram showing a threshold value regarding the exit pupil distance, a range of first to third exit pupil distances, and an optical characteristic curve in the imaging device according to the first embodiment.

The optical characteristic curve representing the section Zk is defined as an optical characteristic curve Zk (k=1, 2, . . . n). For the calculation of Equation (1) which approximates the representative optical characteristic curve Z1 of the section Z1, the constant term Co and the coefficients h4 and h2 are set to Poz1, h4z1, and h2z1. For the calculation of Equation (1) which approximates the optical characteristic curve Z2 of the section Z2, the constant term Co and the coefficients h4 and h2 are set to Poz2, h4z2, and h2z2. Similarly, for the calculation of Equation (1) which approximates the optical characteristic curve Zn of the section Zn, the constant term Co and the coefficients h4 and h2 are set to Pozn, h4zn, and h2zn. FIG. 11 shows the constant terms and coefficients of the calculation which approximates the sections and the optical characteristic curves representing the sections. The interchangeable lens 3 stores the relationship between the sections Z1 to Zn, the constant terms Poz1 to Pozn, the coefficients h4z1 to h4zn, and h2z1 to h2zn which are shown in FIG. 11 in the lens memory 33 as calculation information.

The interchangeable lens 3 of FIG. 9(d) is a zoom lens and has the optical characteristics in which the optical characteristic curve changes according to the focus distance. The interchangeable lens 3 stores in the lens memory 33 the constant terms Co and the coefficients h4 and h2 of the calculation of Equation (1) which approximate the optical characteristic curve for each of the focus distances. A region between the maximum focus distance and the minimum focus distance of the zoom lens set by the zoom lens 31a of FIG. 1 is divided into a plurality of sections W1 to Wn, and one optical characteristic curve representing the section for each of the sections W1 to Wn is defined. For example, an optical characteristic curve at a focus distance in the middle of one section is set as an optical characteristic curve representing the section.

The optical characteristic curve representing the section Wk is defined as the optical characteristic curve Wk (k=1, 2, . . . n). For the calculation of Equation (1) which approximates the optical characteristic curve W1 of the section W1, the constant term Co and the coefficients h4 and h2 are set to Pow1, h4w1 and h2w1. For the calculation of Equation (1) which approximates the optical characteristic curve W2 of the section W2, the constant term Co and the coefficients h4 and h2 are set to Pow2, h4w2, and h2w2. Similarly, for the calculation of Equation (1) which approximates the optical characteristic curve Wn of the section Wn, the constant term Co and the coefficients h4 and h2 are set to Pown, h4wn, and h2wn. FIG. 12 shows the constant terms and coefficients of the calculation which approximates the sections and the optical characteristic curves representing the sections. The interchangeable lens 3 stores in the lens memory 33 the relationship between the sections W1 to Wn shown in FIG. 12, the constant terms Pow1 to Pown, and the coefficients h4w1 to h4wn, and h2w1 to h2wn as calculation information.

Although the interchangeable lens 3 in FIG. 9(d) was a zoom lens having the optical characteristics in which the optical characteristic curve changes according to the focus distance, another zoom lens has optical characteristics in which the optical characteristic curve changes according to the focus distance and the optical characteristic curve also changes according to the position of the focus lens 31b. That is, the optical characteristic curve of another zoom lens changes according to both the position (the focus distance) of the zoom lens 31a and the position of the focus lens 31b.

Next, the relationship between the optical characteristic curve showing the optical characteristics of the interchangeable lens 3 shown in FIG. 9 and the first to third exit pupil distance ranges R1 to R3 shown in FIG. 8 will be described. FIG. 13 shows the first and second threshold values Th1 and Th2 regarding the exit pupil distance shown in FIG. 8, the first to third exit pupil distance ranges R1 to R3, and the optical characteristic curves shown in FIG. 9. In FIG. 13, the entire optical characteristic curve 200g, that is, the exit pupil distance from the zero-image height to the maximum image height Hmax is located within the second exit pupil distance range R2. In the case in which the interchangeable lens 3 having such an optical characteristic curve 200g is mounted in the camera body 2, the selection part 214 selects the second AF pixel pair even when the region setting part 212 sets the focus detection region 100 having a certain image height H.

In the optical characteristic curve 200*h*, the exit pupil distance from the zero-image height to the image height Hf belongs to the second exit pupil distance range R2, but the exit pupil distance from the image height Hf to the maximum image height Hmax belongs to the first exit pupil distance range R1. The selection part 214 selects the second AF pixel pair when the region setting part 212 sets the focus detection region 100 having an image height equal to or less than Hf, and selects the first AF pixel pair when the region setting part 212 sets the focus detection region having an image height larger than the image height Hf.

In the optical characteristic curve 200*i*, the exit pupil distance from the zero-image height to the image height Hg belongs to the third exit pupil distance range R3, but the exit pupil distance from the image height Hg to the maximum image height Hmax belongs to the second exit pupil distance range R2. The selection part 214 selects the third AF pixel pair when the region setting part 212 sets the focus detection region 100 having the image height equal to or less than Hg and selects the second AF pixel pair when the region setting part 212 sets the focus detection region having an image height larger than the image height Hg.

As described above, when a plurality of focus detection regions 100 are set by the region setting part 212, the selection part 214 selects the same type of AF pixel pair in each of the selected focus detection regions 100. In this case, the selection part 214 selects the AF pixel pair based on the position of the focus detection region 100 farthest from the optical axis OA1 of the photographing optical system 31 (the image height H is the highest) among the plurality of selected focus detection regions 100. In the present embodiment, as described above, the selection part 214 selects the AF pixel pair according to the image height of the focus detection region 100 having the highest image height among the plurality of selected focus detection regions 100. The selection part 214 also selects the same type of AF pixel pair as the AF pixel pair selected in the focus detection region 100 having the highest image height among the plurality of selected focus detection regions 100 in the other focus detection regions 100.

Figure 14:
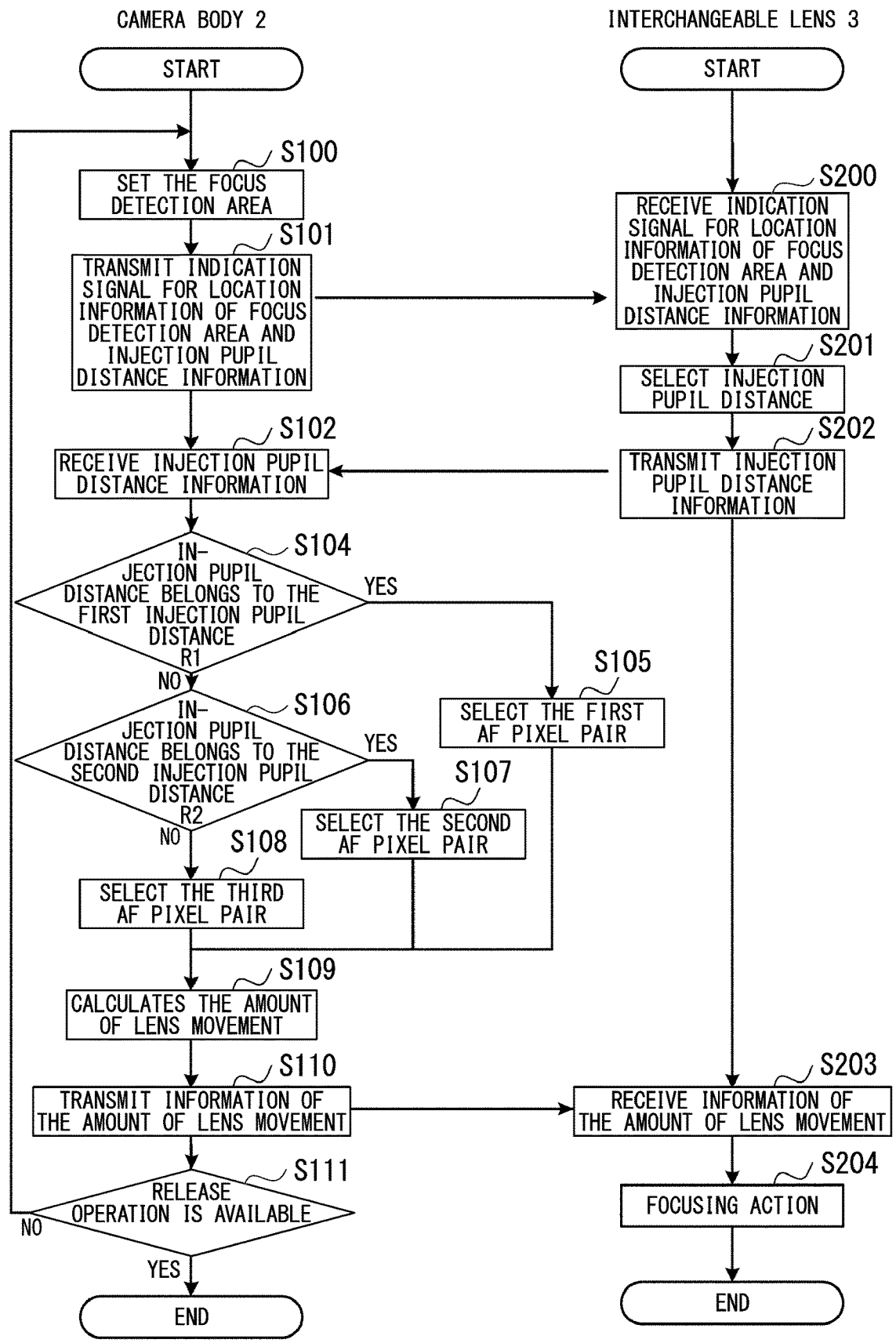
FIG. 14 is a flowchart showing an operation in the imaging device according to the first embodiment.
Figure 15:
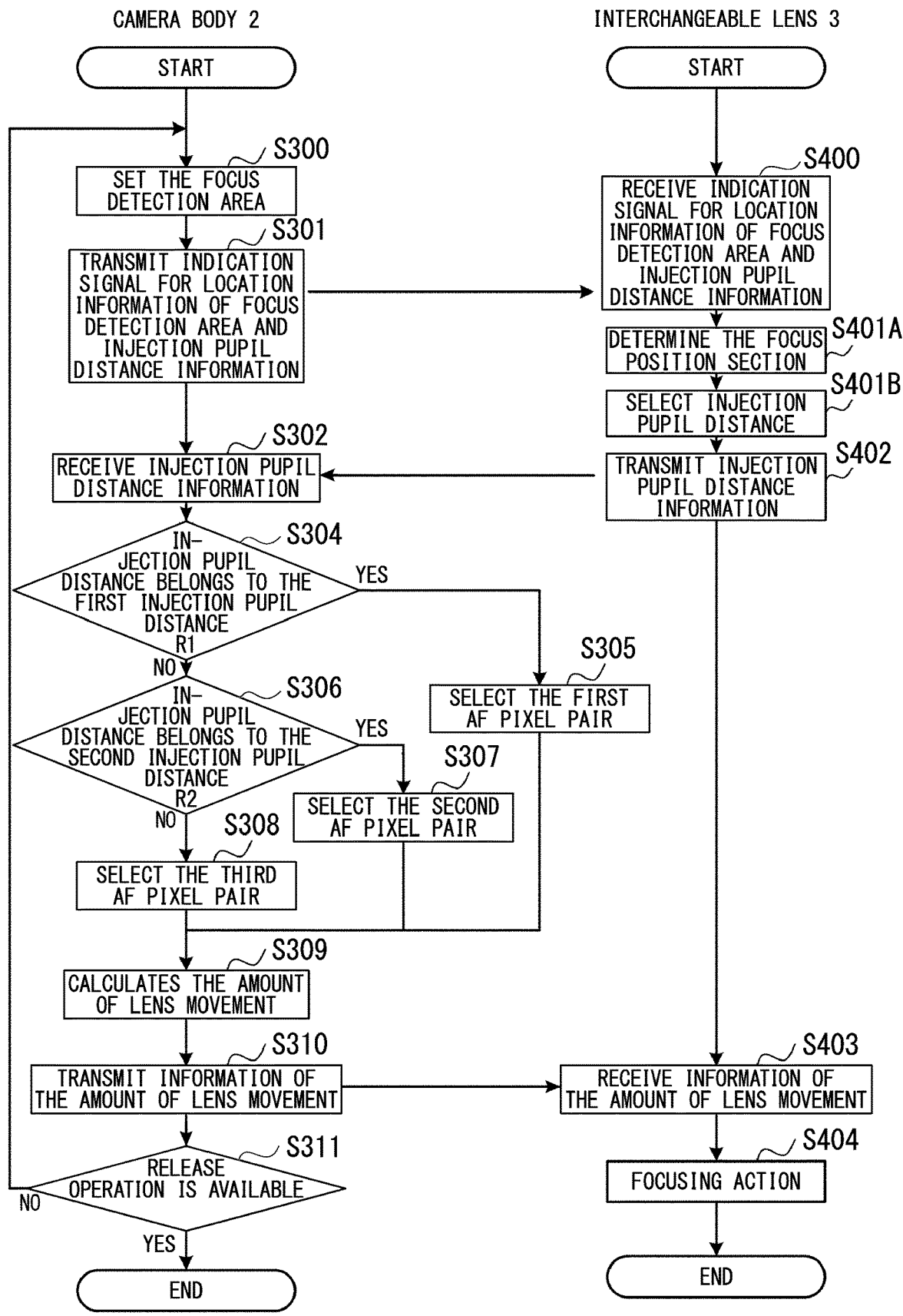
FIG. 15 is a flowchart showing an operation in the imaging device according to the first embodiment.
Figure 16:
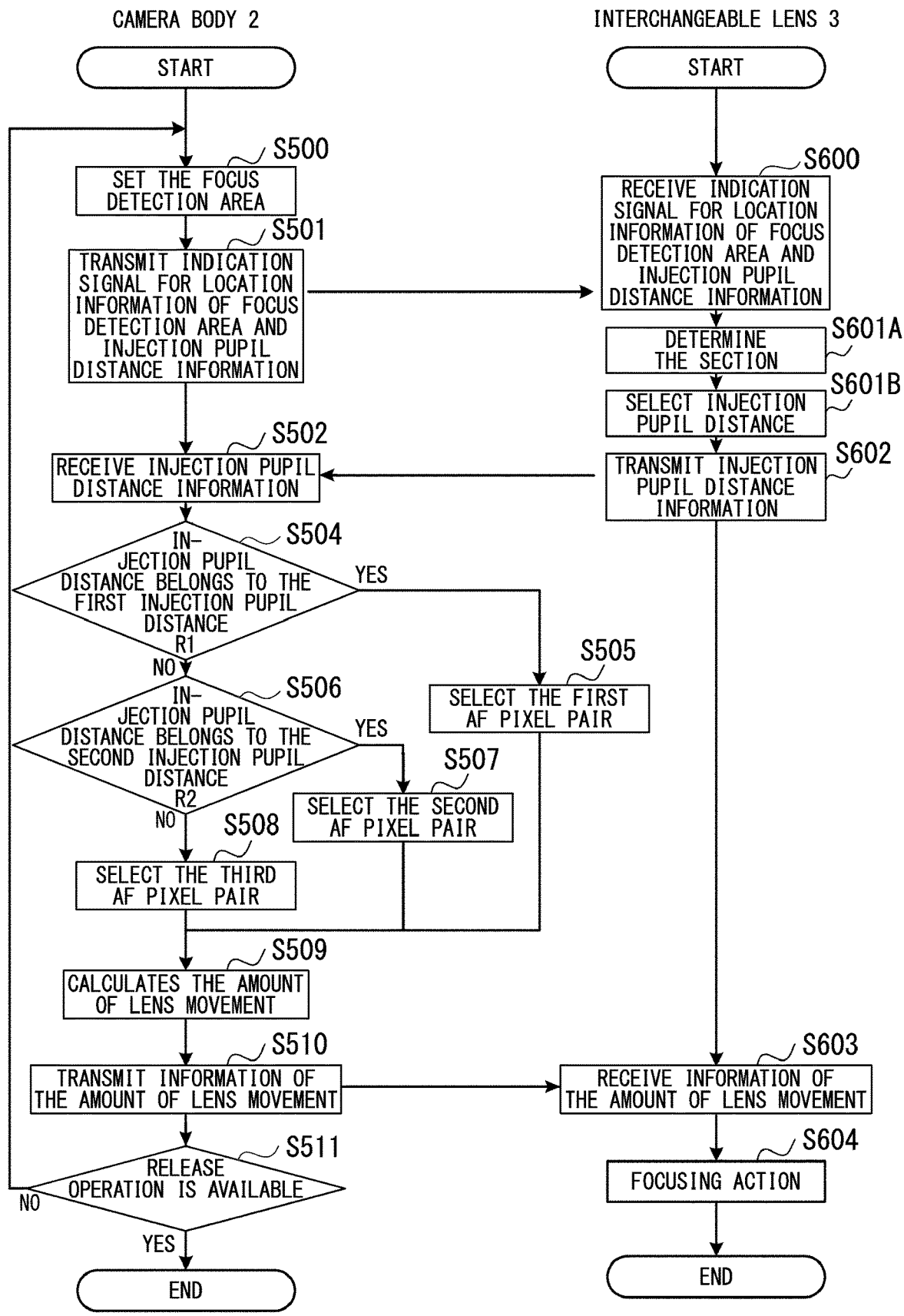
FIG. 16 is a flowchart showing an operation in the imaging device according to the first embodiment.

FIGS. 14 to 16 are flowcharts showing an operation example of the camera 1 of the present embodiment. FIG. 14 shows an operation when the interchangeable lens 3 of the type in which the photographing optical system 31 has a single optical characteristic curve as shown in FIG. 9(*a*) or 9(*b*) is mounted in the camera body 2. In the following description, a case in which the interchangeable lens 3 having a single optical characteristic curve 200*a* shown in FIG. 9(*a*) is mounted in the camera body 2 will be described.

In FIG. 14, in Step S100, for example, when the operation part 25 is operated by a user and an autofocus (AF) mode is set, the region setting part 212 of the camera body 2 sets the focus detection region 100 having a predetermined image height Hx as a region in which focus detection is performed. In Step S101, the camera body 2 transmits a signal (an instruction signal) which instructs (requests) transmission of the position information on the focus detection region 100 set by the region setting part 212 and the information on the exit pupil distance to the interchangeable lens 3.

In Step S200, the interchangeable lens 3 receives an instruction signal of the position information and the information on the exit pupil distance from the camera body 2. In Step 201, the distance calculation part 35 of the interchangeable lens 3 substitutes the image height Hx of the focus detection region part 100 represented by the position information into Equation (1) determined by calculation information (the constant term Poa and the coefficients h4*a* and h2*a*) stored in the lens memory 33 (or the internal memory of the lens control part 32) and calculates an exit pupil distance Pox with respect to the image height Hx. In Step S202, the interchangeable lens 3 transmits information on a calculated exit pupil distance Pox to the camera body 2.

In Step S102, the camera body 2 receives the information on the exit pupil distance from the interchangeable lens 3 and stores the information on the exit pupil distance in the internal memory of the body control part 210. The information on the exit pupil distance may be stored in the body memory 23.

In Step S104, the selection part 214 of the camera body 2 determines whether or not the exit pupil distance Pox indicated by the information on the exit pupil distance belongs to the first exit pupil distance range R1. When the determination result is YES, the process proceeds to Step S105, and the selection part 214 selects the first AF pixel pair.

When the determination result in Step S104 is NO, the process proceeds to Step S106, and the selection part 214 determines whether or not the exit pupil distance Pox indicated by the information on the exit pupil distance belongs to the second exit pupil distance range R2. When the determination result is YES, the process proceeds to Step S107, and the selection part 214 selects the second AF pixel pair.

When the determination result in Step S106 is NO, the exit pupil distance Pox belongs to the third exit pupil distance range R3, so the process proceeds to Step S108, and the selection part 214 selects the third AF pixel pair.

In Step S109, the focus detection part 215 of the camera body 2 performs a correlation calculation on the first and second signals Sig1 and Sig2 of the first and second focus detection pixels of the AF pixel pair selected in Steps S105, S107 or S108 and calculates an amount of image deviation. The focus detection part 215 converts the calculated amount of image deviation into an amount of defocus and calculates the amount of movement of the focus lens 31*b* based on the amount of defocus.

In Step S110, the camera body 2 transmits a calculated signal regarding the amount of movement of the focus lens 31*b* to the interchangeable lens 3. In Step S203, the interchangeable lens 3 receives a signal regarding the amount of movement of the focus lens 31*b* from the camera body 2. In Step S204, the interchangeable lens 3 drives the focus lens 31*b* based on the amount of movement of the focus lens 31*b* to perform a focus adjustment operation.

In Step S111, the camera body 2 determines whether or not a release operation by the operation part 25 has been performed. The camera body 2 repeats a series of operations from Step S100 to Step S110 until the release operation is performed.

FIG. 15 shows an operation when the interchangeable lens 3 in which the optical characteristic curve changes according to the position of the focus lens is mounted in the camera body 2. In the following description, a case in which the interchangeable lens 3 in which the optical characteristic curve changes according to the position of the focus lens shown in FIG. 9(*c*) is mounted in the camera body 2 will be described.

In FIG. 15, in Step S300, when the AF mode is set, the region setting part 212 of the camera body 2 sets the focus detection region 100 having a predetermined image height Hx as a region in which the focus detection is performed. In Step S301, the camera body 2 transmits the instruction signal which instructs transmission of the position information on the focus detection region 100 set by the region setting part 212 and the information on the exit pupil distance to the interchangeable lens 3.

In Step S400, the interchangeable lens 3 receives an instruction signal of the position information and the information on the exit pupil distance from the camera body 2. In Step S401A, the distance calculation part 35 determines which of the sections Z1 to Zn shown in FIG. 11 the position of the focus lens 31b belongs to. In Step S401B, the image height Hx of the focus detection region part 100 represented by the position information is substituted into Equation (1) determined by the constant term Poz and the coefficients h4z and h2z regarding the determined section, and the exit pupil distance Pox with respect to the image height Hx is calculated. When the determined section is Z1, the image height Hx is substituted into Equation (1) determined by the constant term Poz1 and the coefficients h4z1 and h2z1, and the exit pupil distance Pox with respect to the image height Hx is calculated.

In Step S402, the interchangeable lens 3 transmits information on the calculated exit pupil distance Pox to the camera body 2. In Step S302, the camera body 2 receives the information on the exit pupil distance from the interchangeable lens 3 and stores the information on the exit pupil distance in the internal memory (or the body memory 23) of the body control part 210.

In Step S304, the selection part 214 of the camera body 2 determines whether or not the exit pupil distance Pox indicated by the information on the exit pupil distance belongs to the first exit pupil distance range R1. When the determination result is YES, the process proceeds to Step S305, and the selection part 214 selects the first AF pixel pair.

When the determination result in Step S304 is NO, the process proceeds to Step S306, and the selection part 214 determines whether or not the exit pupil distance Pox belongs to the second exit pupil distance range R2. When the determination result is YES, the process proceeds to Step S307, and the selection part 214 selects the second AF pixel pair.

When the determination result in Step S306 is NO, the exit pupil distance Pox belongs to the third exit pupil distance range R3, thus the process proceeds to Step S308, and the selection part 214 selects the third AF pixel pair.

In Step S309, the focus detection part 215 performs a correlation calculation between the first and second signals Sig1 and Sig2 of the AF pixel pair selected in Steps S305, S307 or S308 and calculates the amount of image deviation. The focus detection part 215 converts the calculated amount of image deviation into an amount of defocus and calculates the amount of movement of the focus lens 31b based on the amount of defocus.

In Step S310, the camera body 2 transmits a signal regarding the calculated amount of movement of the focus lens 31b to the interchangeable lens 3. In Step S403, the interchangeable lens 3 receives a signal regarding the amount of movement of the focus lens 31b from the camera body 2. In Step S404, the interchangeable lens 3 drives the focus lens 31b based on the amount of movement of the focus lens 31b and performs the focus adjustment operation.

In Step S311 the camera body 2 determines whether or not the release operation by the operation part 25 has been performed. The camera body 2 repeats a series of operations from Step S300 to Step S310 until the release operation is performed.

FIG. 16 shows an operation when the interchangeable lens 3 is a zoom lens and the optical characteristics of the photographing optical system 31 change according to the focus distance as shown in FIG. 9(d).

In FIG. 16, in Step S500, the region setting part 212 of the camera body 2 sets the focus detection region 100 having a predetermined image height Hx as a region in which the focus detection is performed when the AF mode is set. In Step S501, the camera body 2 transmits an instruction signal which instructs transmission of the position information on the focus detection region 100 set by the region setting part 212 and the exit pupil distance information to the interchangeable lens 3.

In Step S600, the interchangeable lens 3 receives the instruction signal of the position information and the exit pupil distance information from the camera body 2. In Step S601A, the distance calculation part 35 determines which of the sections W1 to Wn shown in FIG. 12 the focus distance of the photographing optical system 31 belongs to based on the focus distance information output from the state detection part 34. In Step S601i, the image height Hx of the focus detection region part 100 indicated by the position information is substituted into Equation (1) determined by the constant term Pow and the coefficients h4w and h2w regarding the determined section, and the exit pupil distance Pox with respect to the image height Hx is calculated. When the determined section is W1, the image height Hx is substituted into Equation (1) determined by the constant term Pow1 and the coefficients h4w1 and h2w1, and the exit pupil distance Pox with respect to the image height Hx is calculated. In this way, in the interchangeable lens 3, the exit pupil distance Pox is calculated based on the focus distance information which is the detection result of the state detection part 34.

In Step S602, the interchangeable lens 3 transmits the information on the calculated exit pupil distance Pox to the camera body 2. In Step S502, the camera body 2 receives the information on the exit pupil distance from the interchangeable lens 3 and stores the information on the exit pupil distance in the internal memory (or the body memory 23) of the body control part 210. The lens control part 32 of the interchangeable lens 3 may transmit the focus distance information and the information on the exit pupil distance to the camera body 2 by one bidirectional communication. In this case, the body control part 210 of the camera body 2 stores the focus distance information and the information on the exit pupil distance in the internal memory of the body control part 210.

In Step S504, the selection part 214 of the camera body 2 determines whether or not the exit pupil distance Pox indicated by the information on the exit pupil distance belongs to the first exit pupil distance range R1. When the determination result is YES, the process proceeds to Step S505, and the selection part 214 selects the first AF pixel pair.

When the determination result in Step S504 is NO, the process proceeds to Step S506, and the selection part 214 determines whether or not the exit pupil distance Pox belongs to the second exit pupil distance range R2. When the determination result is YES, the process proceeds to Step S507, and the selection part 214 selects the second AF pixel pair.

When the determination result in Step S506 is NO, the exit pupil distance Pox belongs to the third exit pupil distance range R3, thus the process proceeds to Step S508, and the selection part 214 selects the third AF pixel pair.

In Step S509, the focus detection part 215 performs a correlation calculation between the first and second signals Sig1 and Sig2 of the AF pixel pair selected in Steps S505, S507 or S508 and calculates the amount of image deviation. The focus detection part 215 converts the calculated amount of image deviation into the amount of defocus and calculates the amount of movement of the focus lens 31*b* based on this amount of defocus.

In Step S510, the camera body 2 transmits a signal regarding the calculated amount of movement of the focus lens 31*b* to the interchangeable lens 3. In Step S603, the interchangeable lens 3 receives a signal regarding the amount of movement of the focus lens 31*b* from the camera body 2. In Step S604, the interchangeable lens 3 drives the focus lens 31*b* based on the amount of movement of the focus lens 31*b* and performs the focus adjustment operation.

In Step S511, the camera body 2 determines whether or not the release operation by the operation part 25 has been performed. The camera body 2 repeats a series of operations from Step S500 to Step S510 until the release operation is performed.

According to the above-described embodiment, the following effects can be obtained.

(1) The interchangeable lens 3 is an interchangeable lens 3 which can be mounted on and removed from a camera body 2 having an imaging part (an imaging element 22), and includes an optical system (a photographing optical system 31) in which an exit pupil distance changes according to a position on an image surface of the imaging part, an input part (a lens control part 32) in which position information on a position of a focus detection region 100 is input from the camera body 2, and an output part (a lens control part 32) which outputs first information (information on the exit pupil distance) on the exit pupil distance of the optical system based on information on the position on the image surface to the camera body 2. In the present embodiment, the position information on the focus detection region 100 is input from the camera body 2 to the lens control part 32. The lens control part 32 calculates the exit pupil distance of the photographing optical system 31 at an image height of the focus detection region 100, and outputs information on the exit pupil distance indicating the calculated exit pupil distance to the camera body 2. Therefore, the camera body 2 can change the AF pixel pair used for the focus detection based on the information on the exit pupil distance and can curb deterioration of the focus detection accuracy.

(2) The camera body 2 is a camera body with a focus detecting device and includes a mounting and removing part (a body-side mount part 201, a body-side connection part 202) which the interchangeable lens 3 having the optical system (the photographing optical system 31) can be mounted on and removed from. In the present embodiment, the information on the exit pupil distance is input from the interchangeable lens 3 to the camera body 2 via the body-side connection part 202. Therefore, the camera body 2 can change the AF pixel pair used for the focus detection based on the information on the exit pupil distance and can curb the deterioration of the focus detection accuracy.

Second Embodiment

Next, a camera of the second embodiment will be described. In the first embodiment, the exit pupil distance is calculated using the calculation information stored in the lens memory 33, and the information on the exit pupil distance is output to the camera body 2. In the second embodiment, the exit pupil distances based on a plurality of image heights are stored in advance in the lens memory 33, and some of the exit pupil distances stored in the lens memory 33 are output to the camera body 2 as the information on the exit pupil distance.

In the present embodiment, information (table) indicating a corresponding relation between the image height and the exit pupil distance of the photographing optical system 31 at the image height is obtained in advance by simulation, experiment, or the like, and is stored in the lens memory 33. The information indicating the exit pupil distance for each of the image heights may be stored in the internal memory of the lens control part 32.

As in the case of the first embodiment, the position information on the focus detection region 100 set by the region setting part 212 is input to the lens control part 32 from the body control part 210 of the camera body 2. The lens control part 32 can grasp the exit pupil distance of the photographing optical system 31 at the image height of the focus detection region 100 set by the region setting part 212 by referring to the above-described corresponding relation stored in the lens memory 33 based on the input position information.

When a signal which instructs transmission of the information on the exit pupil distance is input from the camera body 2, the lens control part 32 outputs to the camera body 2 the exit pupil distance at the image height of the focus detection region 100 indicated by the position information in the information on the exit pupil distance stored in the lens memory 33 as the information on the exit pupil distance. The selection part 214 of the camera body 2 selects an AF pixel pair suitable for the exit pupil distance at the image height of the focus detection region 100 set by the region setting part 212 from a plurality of types of AF pixel pairs based on the information on the exit pupil distance output from the interchangeable lens 3.

The focus detection part 215 performs a correlation calculation between the first and second signals Sig1 and Sig2 of the first and second focus detection pixels of the AF pixel pair selected by the selection part 214 and calculates the amount of image deviation. The focus detection part 215 converts the calculated amount of image deviation into the amount of defocus and calculates the amount of movement of the focus lens 31*b* based on this amount of defocus. The body control part 210 transmits a signal regarding the calculated amount of movement of the focus lens 31*b* to the lens control part 32. The lens control part 32 drives the focus lens 31*b* based on a signal regarding the amount of movement of the focus lens 31*b* and performs the focus adjustment operation.

According to the above-described embodiment, in addition to the same effects as those of the first embodiment, the following effects can be obtained.

(3) The interchangeable lens 3 includes a storage part (for example, the lens memory 33) which stores exit pupil distances based on a plurality of image heights. An output part (the lens control part 32) outputs some of the exit pupil distances stored in the storage part as information on the exit pupil distance. In the present embodiment, the lens control part 32 reads the information on the exit pupil distance at the image height of the focus detection region 100 indicated by the position information from the lens memory 33, and outputs the information to the camera body 2 as the information on the exit pupil distance. Therefore, the camera body 2 can change the AF pixel pair used for the focus detection based on the information on the exit pupil distance and can suppress the deterioration of the focus detection accuracy. Further, an amount of calculation of the lens control part 32 can be reduced as compared with a case in which the exit pupil distance is calculated based on the position information. (4) The body control part 210 transmits the position information on the focus detection region 100 to the lens control part 32, and the lens control part 32 transmits the information on the exit pupil distance of the photographing optical system 31 at the image height of the focus detection region 100 to the body control part 210. Therefore, compared with a case in which the exit pupil distance information based on the plurality of image heights is transmitted from the interchangeable lens 3 to the camera body 2, an amount of data transmitted from the interchangeable lens 3 to the camera body 2 is reduced, and the communication time and the number of communications can be reduced.

Modified Example 1

Figure 17:
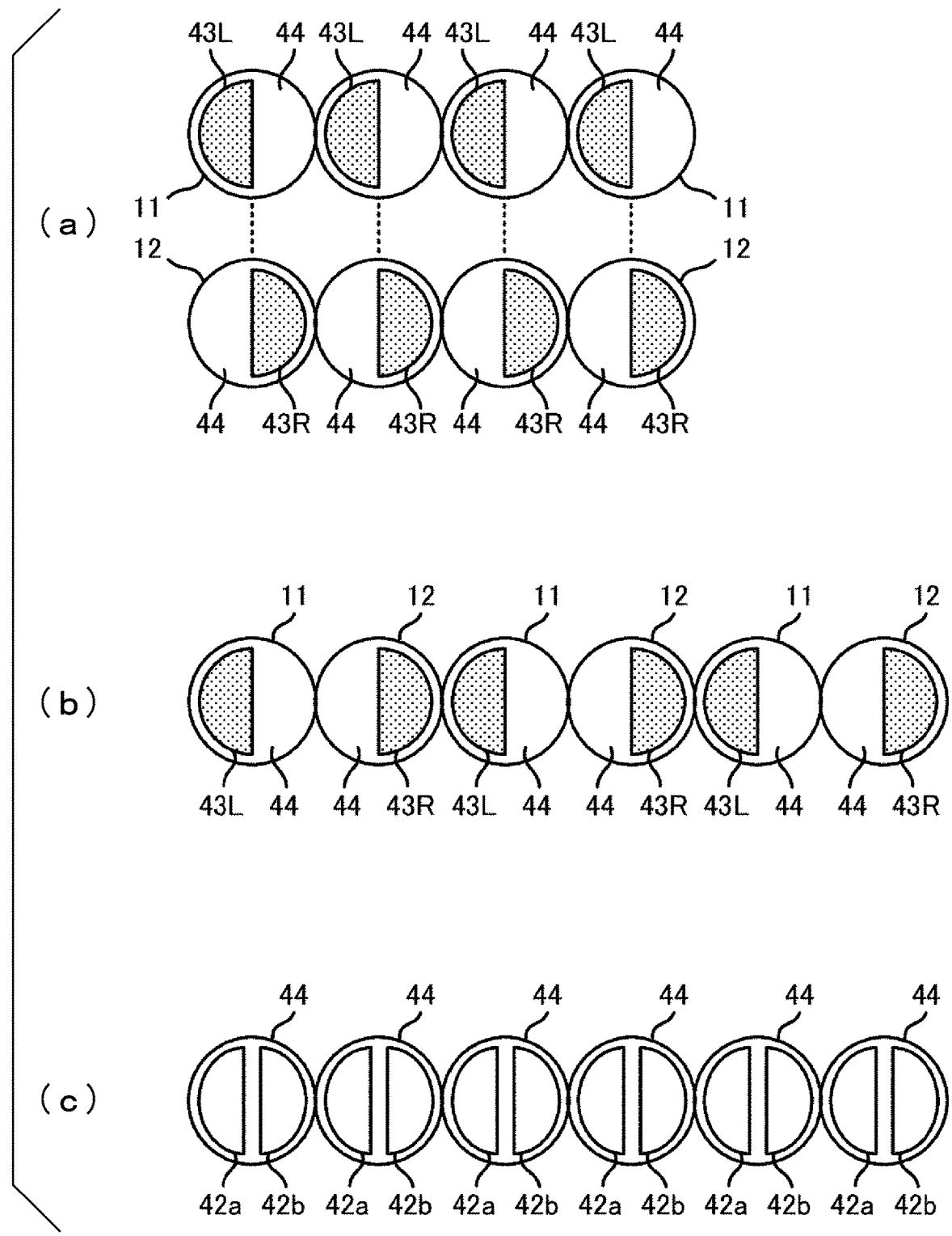
FIG. 17 is a diagram showing a constitution example of focus detection pixels in the imaging device according to the first embodiment.

FIG. 17(*a*) shows the first and second focus detection pixels of the AF pixel pair among the pixels of the imaging element 22 shown in FIG. 3. FIGS. 17(*b*) and 17(*c*) show the focus detection pixels of a modified example thereof. In the example shown in FIG. 3, the photoelectrical conversion part 42, the light-shielding part 43L, and the light-shielding part 43R are shown as rectangular shapes, but they may have a circular shape or other shapes. In FIGS. 17(*a*) to 17(*c*), the photoelectrical conversion part 42, the light-shielding part 43L, and the light-shielding part 43R are shown as a substantially circular shape.

In FIG. 17(*a*), the first focus detection pixel 11 (the micro-lens 44 and the light-shielding part 43L) and the second focus detection pixel 12 (the micro-lens 44 and the light-shielding part 43R) constituting the AF pixel pair are disposed in different rows. On the other hand, the first focus detection pixel 11 (the micro-lens 44 and the light-shielding part 43L) and the second focus detection pixel 12 (the micro-lens 44 and the light-shielding part 43R) constituting the AF pixel pair of the modified example shown in FIG. 17(*b*) are disposed alternately in the same row. In FIGS. 17(*a*) and 17(*b*), the first focus detection pixel 11 outputs the first signal Sig1, and the second focus detection pixel 12 outputs the second signal Sig2. The imaging pixel 13 may be disposed between the first focus detection pixel 11 and the second focus detection pixel 12.

In the above-described embodiment, an example in which one photoelectrical conversion part is disposed in one pixel has been described, but the pixel constitution may be configured to have two or more photoelectrical conversion parts per pixel. In the modified example shown in FIG. 17(*c*), each of the plurality of focus detection pixels includes a micro-lens 44 and a first photoelectrical conversion part 42*a* and a second photoelectrical conversion part 42*b* which photo-electrically convert the light transmitted through the micro-lens 44. That is, this focus detection pixel includes the micro-lens 44 on which the first and second luminous fluxes that have passed through the first and second pupil regions of the exit pupil of the photographing optical system 31 are incident, and the first and second photoelectrical conversion parts 42*a* and 42*b* which receive the first and second luminous fluxes transmitted through the micro-lens 44. The first photoelectrical conversion part 42*a* outputs the first signal Sig1, and the second photoelectrical conversion part 42*b* outputs the second signal Sig2.

The first photoelectrical conversion part 42*a* and the second photoelectrical conversion part 42*b* have different light receiving areas for receiving light. As in the fact that the areas of the light-shielding part 43L of the first focus detection pixel 11 and the light-shielding part 43R of the second focus detection pixel 12 described above are changed according to the image height, the light receiving area of the first photoelectrical conversion part 42*a* and the light receiving area of the second photoelectrical conversion part 42*b* change according to the image height. Further, as in the fact that the area of the light-shielding part 43 differs according to the type of the AF pixel pair (the first, second, and third AF pixel pairs) described above, the light receiving area of the first photoelectrical conversion part 42*a* and the light receiving area of the second photoelectrical conversion part 42*b* differ according to the AF pixel pair.

Second Modified Example

In the above-described embodiment, three reference exit pupils (the first to third exit pupils EP1 to EP3) were used as the reference exit pupil, but two reference exit pupils or four or more reference exit pupils may be used.

Third Modified Example

In the above-described embodiment, the example in which the selection part 214 selects an AF pixel pair to be used for the focus detection from the plurality of types of AF pixel pairs disposed in the focus detection region 100 set by the region setting part 212 has been described. However, the selection part 214 may be set to select the first and second signals Sig1 and Sig2 used for the focus detection. In this case, the imaging element 22 outputs the first and second signals Sig1 and Sig2 of each of the first, second and third AF pixel pairs to the body control part 210. The selection part 214 may be set to select the first and second signals Sig1 and Sig2 output from the AF pixel pair used for the focus detection from the first and second signals Sig1 and Sig2 output from each of the first and second and third AF pixel pairs.

The selection part 214 may switch between selection of the AF pixel pair and selection of the first and second signals Sig1 and Sig2 according to a photographing mode (an operation mode) of the camera body 2 (or the camera 1). For example, when a through image (a live view image) of a subject is displayed on the display part 24 or when a low-resolution moving image is photographed, the selection part 214 may perform the selection of the AF pixel pair to be used for the focus detection. Also, when high-speed continuous photographing is performed or when a high-resolution moving image is photographed, the selection part 214 may perform the selection of the first and second signals Sig1 and Sig2 output from the AF pixel pair used for the focus detection.

Third Embodiment

Next, a camera of the third embodiment will be described. In the camera of the third embodiment, the amount of image deviation is converted into the amount of defocus in the focus detection part 215, that is, the conversion expression which performs conversion is changed according to the image height. In the following description, the description of the same part as the constitution and operation of the camera of the first embodiment will be omitted, and constitution and operation different from the constitution and operation of the camera of the first embodiment will be mainly described.

Figure 18:
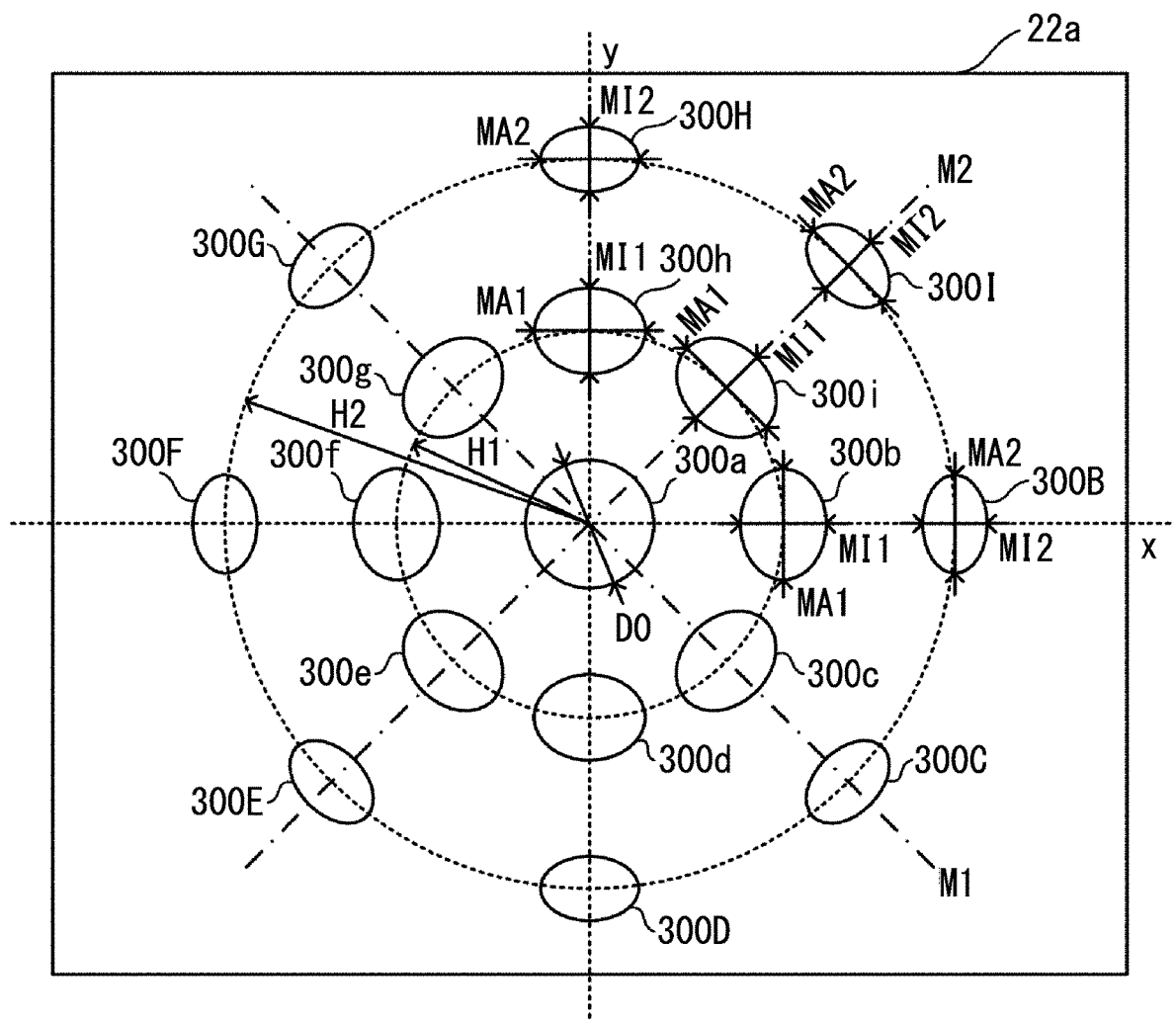
FIG. 18 shows a state in which an exit pupil image changes according to an image height in an imaging device according to a second embodiment.

FIG. 18 shows a state in which exit pupil images 300*a* to 300*i* and 300B to 300I on the imaging surface 22*a* of the imaging element 22 change according to the image height. The exit pupil image is an image obtained by projecting the exit pupil of the photographing optical system 31 onto the photoelectrical conversion part with the micro-lens of the focus detection pixels. A shape of the exit pupil of the photographing optical system 31 changes according to a shape of an opening of the aperture 31c.

FIG. 18 shows the exit pupil image 300a at the zero-image height (the center position of the imaging surface 22a), the exit pupil images 300b to 300i at a first image height H1, and the exit pupil images 300B to 300I at a second image height H2 which is larger than the first image height H1. The exit pupil images 300b to 300i having the first image height H1 are distributed on a concentric circle having the first image height H1 as a radius, and the exit pupil images 300B to 300I having the second image height H2 are distributed on a concentric circle having the second image height H2 as a radius.

When an x-coordinate and a y-coordinate with the center of the imaging surface 22a as an origin are determined, the exit pupil image 300b and the exit pupil image 300B are located on an x-axis, and the exit pupil image 300f and the exit pupil image 300F are also located on the x-axis. The exit pupil image 300b and the exit pupil image 300B, and the exit pupil image 300f and the exit pupil image 300F are point-symmetrical with respect to the origin. The exit pupil image 300d and the exit pupil image 300D are located on a y-axis, and the exit pupil image 300h and the exit pupil image 300H are also located on the y-axis. The exit pupil image 300d and the exit pupil image 300D, and the exit pupil image 300h and the exit pupil image 300H are point-symmetrical with respect to the origin.

The exit pupil image 300c, the exit pupil image 300C, the exit pupil image 300g, and the exit pupil image 300G are located on radiation M1 inclined by 45° with respect to the x-axis, and the exit pupil image 300c and the exit pupil image 300C, and the exit pupil image 300g and the exit pupil image 300G are point-symmetrical with respect to the origin. The exit pupil image 300e, the exit pupil image 300E, the exit pupil image 300i, and the exit pupil image 300I are located on radiation M2 inclined by 45° with respect to the y-axis, and the exit pupil image 300e and the exit pupil image 300E, and the exit pupil image 300i and the exit pupil image 300I are point-symmetrical with respect to the origin.

The exit pupil image 300a at the zero-image height is a substantially circle obtained by reducing a substantially circle having the shape of the opening of the aperture 31c, that is, the shape of the exit pupil. The exit pupil images 300b to 300i having the first image height H1 located on the concentric circle have substantially elliptical shapes which are the same as each other, and the exit pupil images 300B to 300I having the second image height H2 located on the concentric circle also have substantially elliptical shapes which are the same as each other. In the substantially elliptical shape of each of the exit pupil images 300b to 300i having the first image height H1, a length of a major axis, that is, a long diameter MA1 and a length of a minor axis, that is, a short diameter MI1 are smaller than a diameter DO of the substantially circle of the exit pupil image 300a having the zero-image height. In the substantially elliptical shape of the exit pupil images 300B to 300I having the second image height H2, a long diameter MA2 is smaller than the long diameter MA1 of each of the exit pupil images 300b to 300i having the first image height H1, and a short diameter MI2 is also smaller than the short diameter MI1 of each of the exit pupil images 300b to 300i having the first image height H1.

A direction of the elliptical long diameter MA of each of the exit pupil images is perpendicular to a radial direction. That is, the long diameter of each of the exit pupil images 300b, 300B, 300f, and 300F on the x-axis is perpendicular to the x-axis, and the long diameter of each of the exit pupil images 300d, 300D, 300h, and 300H on the y-axis is perpendicular to the y-axis. Further, the long diameter of each of the exit pupil images 300c, 300C, 300g, and 300G on the radiation M1 is perpendicular to the radiation M1, and the long diameter of each of the exit pupil images 300e, 300E, 300i, and 300I on the radiation M2 is perpendicular to the radiation M2.

As described above, the exit pupil image has a substantially circular shape at the zero image height but has a substantially elliptical shape when the image height H is large. The substantially elliptical shape has a long diameter MA and a short diameter MI which gradually decrease as the image height H increases. The shape and size of the exit pupil image change according to the image height H. Further, since the shape and size of the exit pupil image change according to the optical characteristics of the photographing optical system 31, they also differ according to the type of the interchangeable lens 3.

Figure 19:
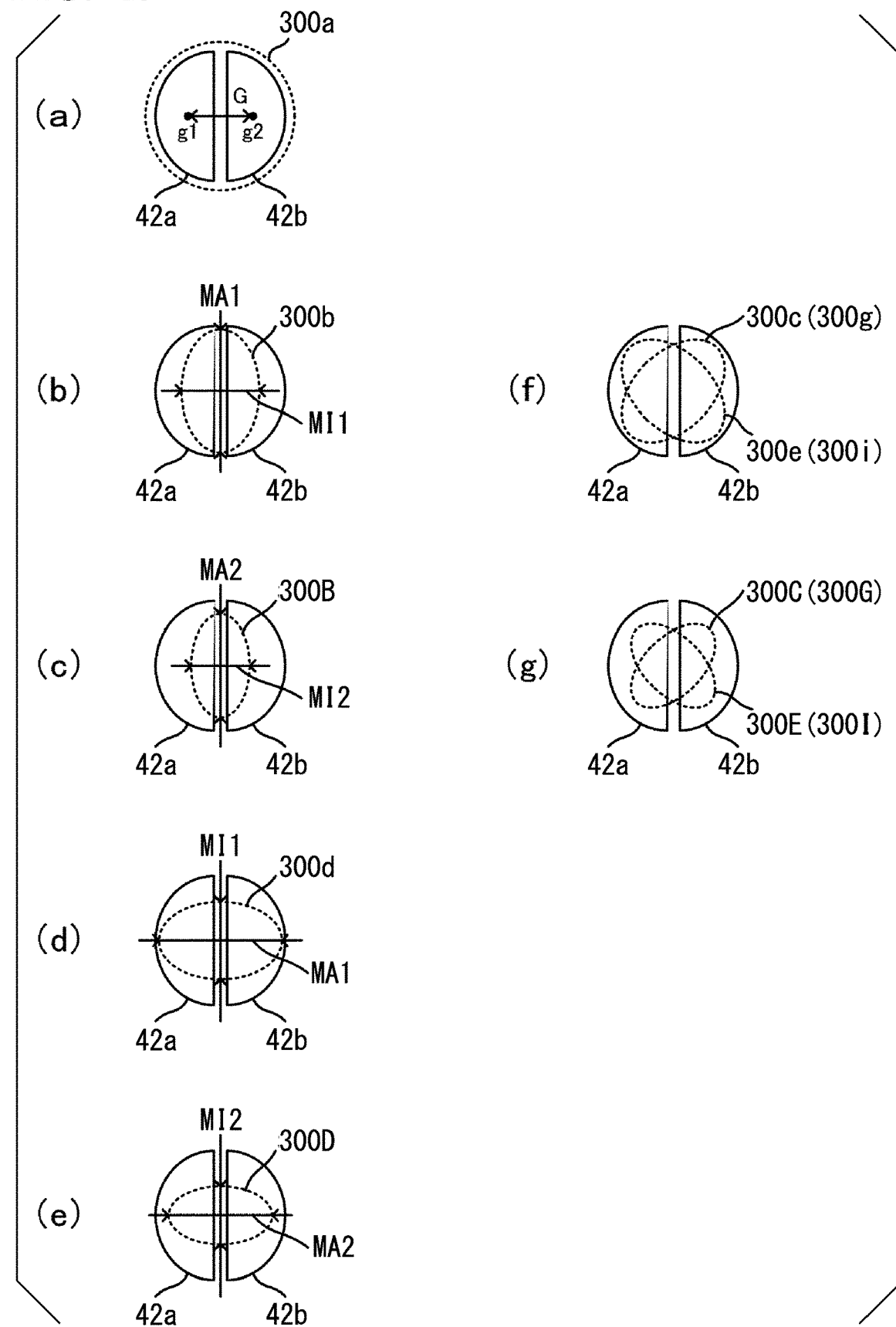
FIG. 19 is a diagram showing the relationship between a pair of photoelectrical conversion parts and an exit pupil image in the imaging device according to the second embodiment.

Next, the relationship between the photoelectrical conversion part of the focus detection pixel and the exit pupil image projected on the photoelectrical conversion part by the micro-lens will be described. FIG. 19 shows the relationship between the pair of photoelectrical conversion parts 42a and 42b and the exit pupil image 300 which takes the focus detection pixel shown in FIG. 17(c) as an example. In the shown example, each of the pair of photoelectrical conversion parts 42a and 42b has a semicircular shape obtained by dividing a circle having a diameter DO into two equal portions.

FIG. 19(a) shows the relationship between the photoelectrical conversion parts 42a and 42b of the focus detection pixel at the zero-image height and the exit pupil image 300a. Since the exit pupil image 300a having a substantially circular shape has the diameter DO, it covers the entire pair of photoelectrical conversion parts 42a and 42b.

FIG. 19(b) shows the relationship between the exit pupil image 300b having the first image height H1 and the photoelectrical conversion parts 42a and 42b of the focus detection pixel at that position. The exit pupil image 300b has a substantially elliptical shape which is vertically long, and a long diameter MA1 thereof is smaller than the diameter DO. A direction of the short diameter MI1 of the exit pupil image 300b coincides with an arrangement direction of the pair of photoelectrical conversion parts 42a and 42b (an x-axis direction in FIG. 18), and the short diameter MI1 is smaller than the diameter DO. The relationship between the exit pupil image 300f at a position at which it is point-symmetrical to the exit pupil image 300b with respect to the origin and the photoelectrical conversion parts 42a and 42b of the focus detection pixel at that position is also the same as in FIG. 19(b).

FIG. 19(c) shows the relationship between the exit pupil image 300B having the second image height H2 and the photoelectrical conversion parts 42a and 42b of the focus detection pixel at that position. The exit pupil image 300B has a substantially elliptical shape which is vertically long and smaller than the exit pupil image 300b, and a long diameter MA2 and a short diameter MI2 thereof are further smaller than the long diameter MA1 and the short diameter MI1 of the exit pupil image 300b. The relationship between the exit pupil image 300F at a position at which it is point-symmetrical to the exit pupil image 300B with respect to the origin and the photoelectrical conversion parts 42a and 42b of the focus detection pixel at that position is also the same as in FIG. 19(c).

FIG. 19(d) shows the relationship between the exit pupil image 300d having the first image height H1 and the photoelectrical conversion parts 42a and 42b of the focus detection pixel at that position. The exit pupil image 300d has a substantially elliptical shape which is horizontally long. A direction of the long diameter MA1 of the exit pupil image 300d coincides with the arrangement direction of the pair of photoelectrical conversion parts 42a and 42b, and the long diameter MA1 is smaller than the diameter DO. The relationship between the exit pupil image 300h at a position at which it is point-symmetrical to the exit pupil image 300d with respect to the origin and the photoelectrical conversion parts 42a and 42b of the focus detection pixel at that position is also the same as in FIG. 19(d).

FIG. 19(e) shows the relationship between the exit pupil image 300D having the second image height H2 and the photoelectrical conversion parts 42a and 42b of the focus detection pixel at that position. The exit pupil image 300D has a substantially elliptical shape which is horizontally long and smaller than the exit pupil image 300d, and the long diameter MA2 and the short diameter MI2 are further smaller than the long diameter MA1 and the short diameter MI1 of the exit pupil image 300d. The relationship between the exit pupil image 300H at a position at which it is point-symmetrical to the exit pupil image 300D with respect to the origin and the photoelectrical conversion parts 42a and 42b of the focus detection pixel at that position is also the same as in FIG. 19(e).

FIG. 19(f) shows the relationship between each of the exit pupil images 300c, 300g, 300e, and 300i having the first image height H1 on the radiations M1 and M2 and the photoelectrical conversion parts 42a and 42b of the focus detection pixel at that position. The directions of the long diameter MA and the short diameter MI of the exit pupil images 300c, 300g, 300e, and 300i are inclined with respect to the arrangement direction of the pair of photoelectrical conversion parts 42a and 42b.

FIG. 19(g) shows the relationship between each of the exit pupil images 300C, 300G, 300E, and 300I having the second image height H2 on the radiations M1 and M2 and the photoelectrical conversion parts 42a and 42b of the focus detection pixel at that position. In each of the exit pupil images 300C, 300G, 300E, and 300I, the direction of the long diameter MA and the direction of the short diameter MI are inclined with respect to the arrangement direction of the pair of photoelectrical conversion parts 42a and 42b.

In the first embodiment, the example in which the focus detection part 215 converts the amount of image deviation into the amount of defocus has been described, but the conversion of the amount of image deviation into the amount of defocus will be described below. The conversion expression for converting the amount of image deviation Δ into the amount of defocus Def can be expressed as follows using a conversion coefficient K1.

$$Def = K1 \times \Delta \quad (2)$$

The conversion coefficient K1 depends on the distance of the center of gravity between a position of the center of gravity of an overlapping region between the exit pupil images 300a to 300I and the photoelectrical conversion part 42a, and a position of the center of gravity of an overlapping region between the exit pupil images 300a to 300I and the photoelectrical conversion part 42b. The conversion coefficient K1 is proportional to a reciprocal number of the distance of the center of gravity.

FIG. 19(a) shows a distance G1 of the center of gravity between a position g1 of the center of gravity of an overlapping region between the exit pupil image 300a and the photoelectrical conversion part 42a and a position g2 of the center of gravity of an overlapping region between the exit pupil image 300a and the photoelectrical conversion part 42b. The above-described overlapping region between the exit pupil image and the photoelectrical conversion part 42a is a region in which the luminous flux passing through the first pupil region of the exit pupil of the photographing optical system 31 is incident on the photoelectrical conversion part 42a. Similarly, the above-described overlapping region between the exit pupil image and the photoelectrical conversion part 42b is a region in which the luminous flux passing through the second pupil region of the exit pupil of the photographing optical system 31 is incident on the photoelectrical conversion part 42b.

Since the distance of the center of gravity of the focus detection pixel of the exit pupil image 300b having the first image height H1 shown in FIG. 19(b) is smaller than the distance of the center of gravity of the focus detection pixel of the exit pupil image 300a having the zero-image height in FIG. 19(a), the conversion coefficient K1 of the focus detection pixel in FIG. 19(b) is larger than the conversion coefficient K1 in FIG. 19(a).

Further, since the distance of the center of gravity of the focus detection pixel of the exit pupil image 300B having the second image height H2 shown in FIG. 19(c) is smaller than the distance of the center of gravity of the focus detection pixel of the exit pupil image 300b of the first image height H1 in FIG. 19(b), the conversion coefficient K1 of the focus detection pixel in FIG. 19(c) is larger than the conversion coefficient in FIG. 19(b).

Since the distance of the center of gravity of the focus detection pixel of the exit pupil image 300d having the first image height H1 shown in FIG. 19(d) is smaller than the distance of the center of gravity of the focus detection pixel of the exit pupil image 300a having zero image height in FIG. 19(a), the conversion coefficient K1 of the focus detection pixel in FIG. 19(d) is larger than the conversion coefficient K1 in FIG. 19(a).

Further, since the distance of the center of gravity of the focus detection pixel of the exit pupil image 300D having the second image height H2 shown in FIG. 19(e) is smaller than the distance of the center of gravity of the focus detection pixel of the exit pupil image 300d having the first image height H1 in FIG. 19(d), the conversion coefficient K1 of the focus detection pixel in FIG. 19(e) is larger than the conversion coefficient K1 in FIG. 19(d).

In the focus detection pixel of each of the exit pupil images 300c, 300g, 300e, and 300i of the first image height H1 shown in FIG. 19(f), the distance of the center of gravity thereof is an intermediate value between the distance of the center of gravity for the focus detection pixel in FIG. 19(b) and the distance of the center of gravity for the focus detection pixel in FIG. 19(d). The conversion coefficient K1 of the focus detection pixel of FIG. 19(f) is an intermediate value between the conversion coefficient K1 of the focus detection pixel of FIG. 19(b) and the conversion coefficient K1 of the focus detection pixel of FIG. 19(d).

Similarly, in the focus detection pixel of each of the exit pupil images 300C, 300G, 300E, and 300I of the second image height H2 shown in FIG. 19(g), the distance of the center of gravity thereof is an intermediate value between the distance of the center of gravity for the focus detection pixel in FIG. 19(c) and the distance of the center of gravity for the focus detection pixel in FIG. 19(e). The conversion coefficient K1 of the focus detection pixel of FIG. 19(g) is an intermediate value between the conversion coefficient K1 of the focus detection pixel of FIG. 19(c) and the conversion coefficient K1 of the focus detection pixel of FIG. 19(e). As shown in FIGS. 19(f) and 19(g), the distance of the center of gravity when the major axis and the minor axis of the exit pupil image are inclined with respect to the arrangement direction of the photoelectrical conversion parts 42a and 42b is a distance in the arrangement direction of the photoelectrical conversion parts 42a and 42b.

Figure 20:
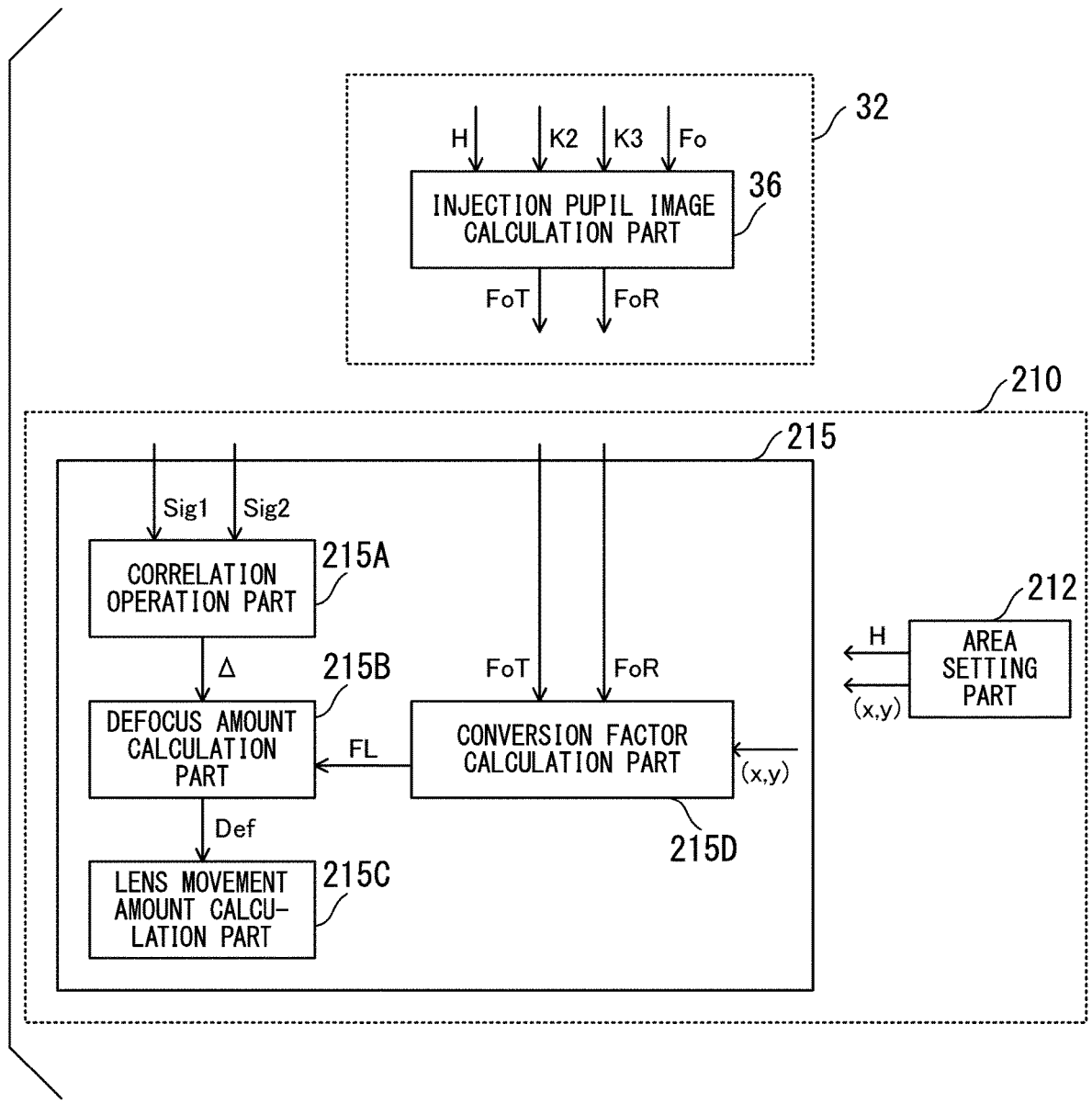
FIG. 20 is a block diagram showing a plurality of functions performed by a focus detection part in the imaging device according to the second embodiment in blocks for each function.

Next, a constitution example of the focus detection part 215 of the camera body 2 of the present embodiment will be described. FIG. 20 shows an exit pupil image calculation part 36 included in the lens control part 32 which will be described later, and a focus detection part 215 and a region setting part 212 included in the body control part 210. Further, in FIG. 20, a plurality of functions carried out by the focus detection part 215 are shown as blocks for each of functions.

The region setting part 212 sets one focus detection region 100 from the plurality of focus detection regions 100, and outputs the image height H of the set focus detection region 100 and the coordinates (x, y) of the focus detection region. The region setting part 212 outputs the image height at the center of the set focus detection region 100 as the image height H of the set focus detection region 100, and outputs the coordinates of the center of the focus detection region 100 as the coordinates (x, y) of the focus detection region. The body control part 210 outputs the position information indicating the image height H of the focus detection region 100 set by the region setting part 212 to the interchangeable lens 3.

The position information on the focus detection region 100 output from the body control part 210, an F value (an aperture value) Fo of the aperture 31c, and coefficients K2 and K3 described later are input in the exit pupil image calculation part 36 of the interchangeable lens 3. The exit pupil image calculation part 36 stores in advance operation expressions of the following Equations (3) and (4) indicating the exit pupil images on the concentric circles having the image height H with the image height H as a variable in an internal memory or the like.

$$FoT=(1+K2 \times H^2) \times Fo \quad (3)$$

$$FoR=(1+K3 \times H^2) \times Fo \quad (4)$$

In Equations (3) and (4), Fo is, for example, an open F value (an open aperture value) of the aperture 31c of the photographing optical system 31. The coefficients K2 and K3 of the variable H2 are values determined by the optical characteristics of the photographing optical system 31. These coefficients K2 and K3 are stored in advance in the lens memory 33 of the interchangeable lens 3. The exit pupil image calculation part 36 acquires, for example, information on the coefficients K2 and K3 based on the shape of the exit pupil in an open aperture state from the lens memory 33. The exit pupil image calculation part 36 may acquire information on the coefficients K2 and K3 based on the shape of the exit pupil in a state in which the aperture 31c is stopped down by one step from the lens memory 33. The information on the coefficients K2 and K3 may be stored in advance in the internal memory of the lens control part 32.

The FoT of Equation (3) indicates a size of the exit pupil image in the radial direction from the center of the imaging surface 22a (the optical axis of the photographing optical system 31), that is, the short diameter MI of the exit pupil image having a substantially elliptical shape using an F value Fo of the aperture 31c of the photographing optical system 31. Similarly, the FoR of Equation (4) indicates the size of the exit pupil image in a circumferential direction of a concentric circle having the image height H, that is, the long diameter MA of the exit pupil image having a substantially elliptical shape using the F value Fo of the aperture 31c of the photographing optical system 31. Because the exit pupil image 300 is a projection image of the exit pupil of the photographing optical system 31 as described above, the shape of the exit pupil image is indicated using the F value of the aperture 31c. The F value Fo may not be the open F value of the aperture 31c but may be the F value of the aperture which is stopped down more than the open F value.

When H=0 which has the zero-image height is substituted into Equations (3) and (4), both FoT which indicates a size of the exit pupil image in the radial direction, and FoR which indicates a size thereof in the circumferential direction are Fo. This indicates the shape of the exit pupil image 300a having the zero-image height shown in FIG. 18. Further, in Equations (3) and (4), as the image height H increases, both the size FoT of the exit pupil image in the radial direction and the size FoR thereof in the circumferential direction increase. Equations (3) and (4) show that as the image height H increases, the long diameter MA and the short diameter MI of the exit pupil image 300 decrease as shown in FIG. 18.

The exit pupil image calculation part 36 calculates the size FoT of the exit pupil image in the radial direction and the size FoR thereof in the circumferential direction using the above-described Equations (3) and (4). The lens control part 32 generates information on FoT and FoR calculated by the exit pupil image calculation part 36 as information on the shape of the exit pupil (hereinafter, referred to as information on the exit pupil shape). When a signal which instructs transmission of the information on the exit pupil shape is input from the camera body 2, the lens control part 32 transmits the information on the exit pupil shape generated based on the position information on the focus detection region 100 to the camera body 2.

In FIG. 20, the focus detection part 215 of the camera body 2 includes a correlation calculation part 215A, a defocus amount calculation part 215B, a lens movement amount calculation part 215C, and a conversion coefficient calculation part 215D.

The correlation calculation part 215A of the focus detection part 215 receives the first and second signals Sig1 and Sig2, performs a correlation calculation between the first and second signals Sig1 and Sig2, and calculates a phase difference between the first and second signals Sig1 and Sig2, that is, the amount of image deviation Δ. The defocus amount calculation part 215B converts the amount of image deviation Δ into the amount of defocus Def by the conversion expression shown in Equation (2), that is, the amount of image deviation Δ is multiplied by the conversion coefficient K1 according to the exit pupil image, and calculates the amount of defocus Def. The lens movement amount calculation part 215C calculates the amount of movement of the focus lens 31b based on the amount of defocus Def calculated by the defocus amount calculation part 215B. The lens control part 32 of the interchangeable lens 3 moves the focus lens 31b based on the calculated amount of movement of the focus lens 31b and performs the focus adjustment.

The coordinate value (x, y) of the focus detection region 100 set by the region setting part 212 and the information (FoT and FoR) on the exit pupil shape are input in the conversion coefficient calculation part 215D. The conversion coefficient calculation part 215D stores in advance the operation expression of the following Equation (5) for calculating a length of the exit pupil image 300 in the arrangement direction (the x-axis direction of FIG. 18) of the pair of photoelectrical conversion parts 42a and 42b shown in FIG. 19, that is, the FL indicating the size in the x direction in the internal memory or the like.

$$FL=(FoT \times x^2 + FoR \times y^2)/(x^2+y^2) \quad (5)$$

Since this FL is indicated by the F value Fo, the length of the exit pupil image 300 in the x direction decreases as the FL increases.

In Equation (5), for example, the size FL of the exit pupil image 300b shown in FIG. 18 in the x direction becomes the size FoT in the radial direction by substituting the coordinates (xb, 0) of the exit pupil image 300b. Similarly, for example, the size FL of the exit pupil image 300d shown in FIG. 18 in the x direction becomes the size FoR in the radial direction by substituting the coordinates (0, yd) of the exit pupil image 300d.

The conversion coefficient calculation part 215D sends the calculated size FL of the exit pupil image 300 in the x direction as a conversion coefficient to the defocus amount calculation part 215B. The defocus amount calculation part 215B converts the amount of image deviation Δ into the amount of defocus Def using K1=a×FL2+b as the conversion coefficient K1 of Equation (2). However, a and b are constants.

In the above description, as the conversion coefficient K1, the size FL of the exit pupil image 300 in the x direction is used instead of the distance G of the center of gravity described with reference to FIG. 19(a). This is because the distance G of the center of gravity decreases as the size FL of the exit pupil image 300 in the x direction increases.

In order to improve the accuracy of converting the amount of image deviation into the amount of defocus, the distance of the center of gravity may be calculated from the size FL, and the amount of defocus may be converted using the distance of the center of gravity.

Figure 21:
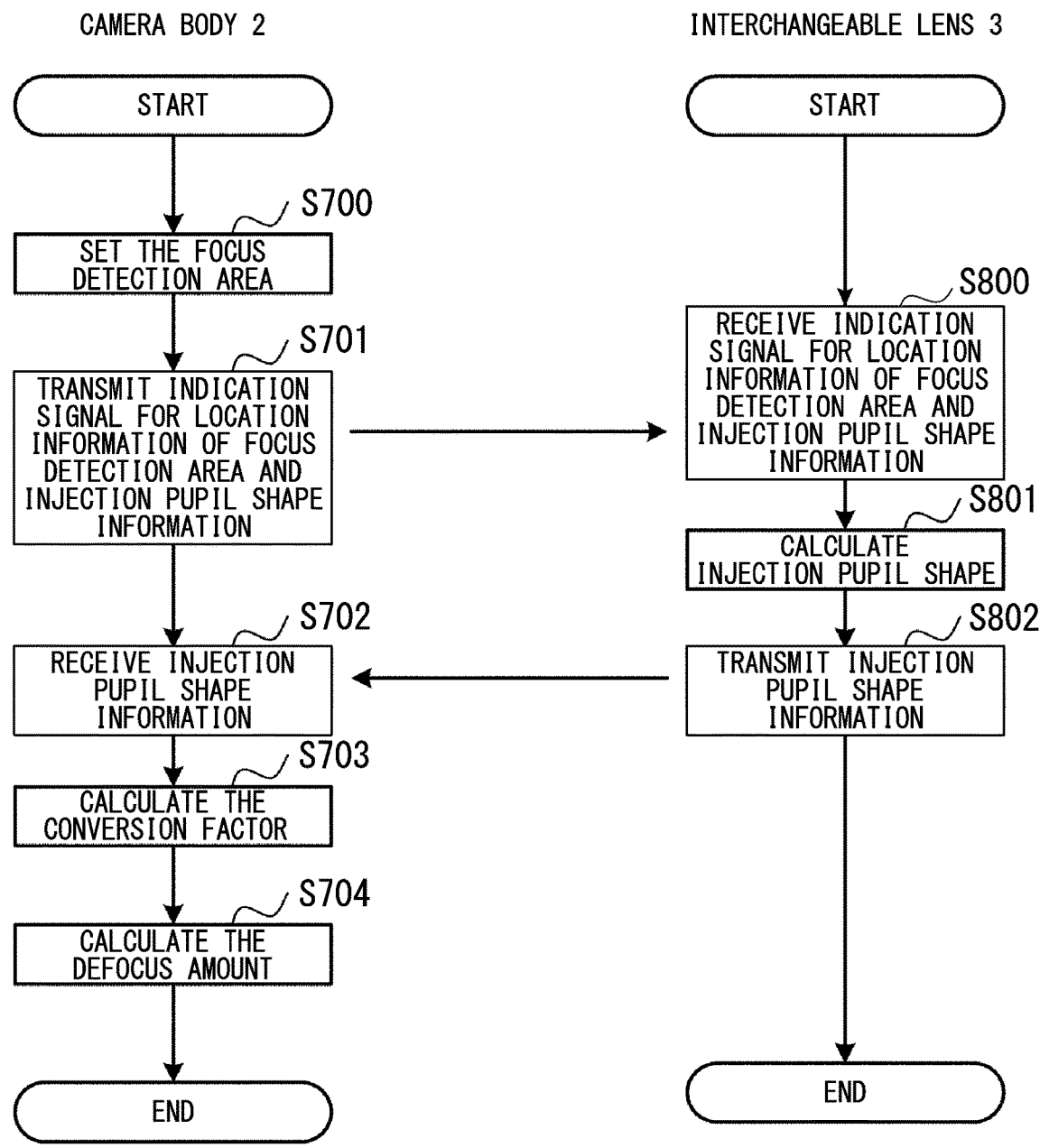
FIG. 21 is a flowchart showing an operation in the imaging device according to the second embodiment.

FIG. 21 is a flowchart showing an operation example in which the amount of image deviation is converted into the amount of defocus in the focus detection part 215 of the camera of the present embodiment. FIG. 21 shows an operation of the photographing optical system 31 when the interchangeable lens 3 having optical characteristics which generates the exit pupil images 300a to 300i and 300B to 300I as shown in FIG. 18 is mounted to the camera body 2.

In FIG. 21, in Step S700, for example, when the operation part 25 is operated by the user and the autofocus (AF) mode is set, the region setting part 212 of the camera body 2 sets the focus detection region 100 having a predetermined image height Hx as a region for performing the focus detection. In Step S701, the camera body 2 transmits to the interchangeable lens 3 an instruction signal which instructs the transmission of the position information indicating the image height H of the focus detection region 100 set by the region setting part 212 and the information on the exit pupil shape.

In Step S800, the interchangeable lens 3 receives the instruction signal of the position information and the information on the exit pupil shape from the camera body 2. In Step S801, the exit pupil image calculation part 36 of the interchangeable lens 3 substitutes the image height H of the focus detection region part 100 indicated by the position information into Equations (3) and (4) determined by the coefficients K2 and K3 and the F value Fo and calculates FoT and FoR. In Step S802, the interchangeable lens 3 transmits the calculated information on the exit pupil shape (FoT, FoR) to the camera body 2.

In Step S702, the camera body 2 receives the information on the exit pupil shape from the interchangeable lens 3 and stores the information of the exit pupil shape in the internal memory of the body control part 210. The information on the exit pupil distance may be stored in the body memory 23.

In Step S703, the conversion coefficient calculation part 215D substitutes the coordinate values (x, y) of the focus detection region 100 set by the region setting part 212 and the FoT and FoR indicated by the information on the exit pupil shape into Equation (5), and calculates the size FL of the exit pupil image 300 in the arrangement direction (the x-axis direction of FIG. 18) of the pair of photoelectrical conversion parts 42a and 42b. The conversion coefficient calculation part 215D sends the calculated size FL of the exit pupil image 300 in the x direction as the conversion coefficient to the defocus amount calculation part 215B.

In Step S704, the defocus amount calculation part 215B converts the amount of image deviation Δ into the amount of defocus Def using K1=a×FL2+b as the conversion coefficient K1 of Equation (2).

When the F value of the aperture 31c at the time of focus detection is changed or the focus detection region is changed, the camera 1 repeats a series of operations of Steps S800 to S802 and Steps S701 to S704.

When the interchangeable lens 3 has both the optical characteristics described with reference to FIG. 9 in the first embodiment and the optical characteristics described with reference to FIG. 18 in the third embodiment, the interchangeable lens 3 performs the operations described in the first and third embodiments.

According to the above-described embodiment, the following effects can be obtained.

(1) The output part (the lens control part 32) outputs second information (the information on the exit pupil shape) regarding the shape of the exit pupil of the optical system based on the information on the position on the image surface. In the present embodiment, the lens control part 32 outputs the information on the exit pupil shape of the photographing optical system 31 at the image height of the focus detection region 100 to the camera body 2. Therefore, the camera body 2 can change the conversion coefficient used for calculating the amount of defocus based on the information on the exit pupil shape and can curb the deterioration of the focus detection accuracy. The camera 1 changes the conversion coefficient used for calculating the amount of defocus according to the exit pupil image which changes in one interchangeable lens 3 or the exit pupil image which changes as the interchangeable lens 3 changes. Thus, the camera 1 can perform highly accurate focus detection even when the exit pupil image changes. As a result, it is possible to curb a decrease in the focus detection accuracy.

Modified Example 4

In the second embodiment, the sizes of the exit pupil images 300a to 300i and 300B to 300I in the radial direction, that is, the short diameter MI of the exit pupil image having a substantially elliptical shape was indicated by Equation (3) using the F value of the aperture 31c. Similarly, the sizes of the exit pupil images 300a to 300i and 300B to 300I in the circumferential direction, that is, the long diameter MA of the exit pupil image having a substantially elliptical shape is indicated by Equation (4) using the F value of the aperture 31c. The short diameter MI and the long diameter MA of the exit pupil image may be indicated using an opening diameter of the aperture 31c instead of the F value of the aperture 31c.

Modified Example 5

In the second embodiment, the exit pupil image calculation part 36 calculates FoT and FoR using the image height H, the coefficients K2 and K3 and the F value Fo, and the conversion coefficient calculation part 215D calculates FL using FoT and FoR and the coordinates (x, y). In the modified example, the conversion coefficient calculation part 215D is omitted, and the exit pupil image calculation part 36 directly calculates the FL using the coefficients K2 and K3, the F value Fo, and the coordinates (x, y). This will be described below.

When the FoT of Equation (3) and the FoR of Equation (4) are substituted into the FoT and FoR of Equation (5) described above, the following Equation (6) is obtained.

$$FL=\{(1+K2\times H^2)Fo\times x^2+(1+K3\times H^2)Fo\times y^2\}/(x^2+y^2) \quad (6)$$

$H^2=x^2+y^2$ is established between the image height H of the focus detection region 100 set by the region setting part 212 and the coordinates (x, y) of the focus detection region. When this $H^2=x^2+y^2$ is substituted into $H^2$ in Equation (6), the FL can be indicated by the following Equation (7).

$$FL=\{(1+K2(x^2+y^2))Fo\times x^2+(1+K3(x^2+y^2))Fo\times y^2\}/(x^2+y^2) \quad (7)$$

The exit pupil image calculation part 36 according to the modified example calculates the FL based on Equation (7) using the coefficients K2 and K3 and F value Fo and the coordinate values (x, y) of the focus detection region 100 transmitted from the camera body 2. The exit pupil image calculation part 36 transmits information on the calculated FL to the camera body 2.

A method of obtaining FoT and FoR is not limited to the method using Equations (3) and (4) described above. An operation expression other than Equations (3) and (4) may be used. A table showing the relationship between the image height and FoT and FoR may be used.

Further, the method of obtaining FL is not limited to the method using Equation (5) or (6) described above. Other operation expressions may be used. A table showing the relationship between the coordinates (x, y), the F values Fo, and the FL may be used.

The following modified examples are also within the scope of the present invention, and one or more of the modified examples can be combined with the above-described embodiment.

Modified Example 6

Figure 22:
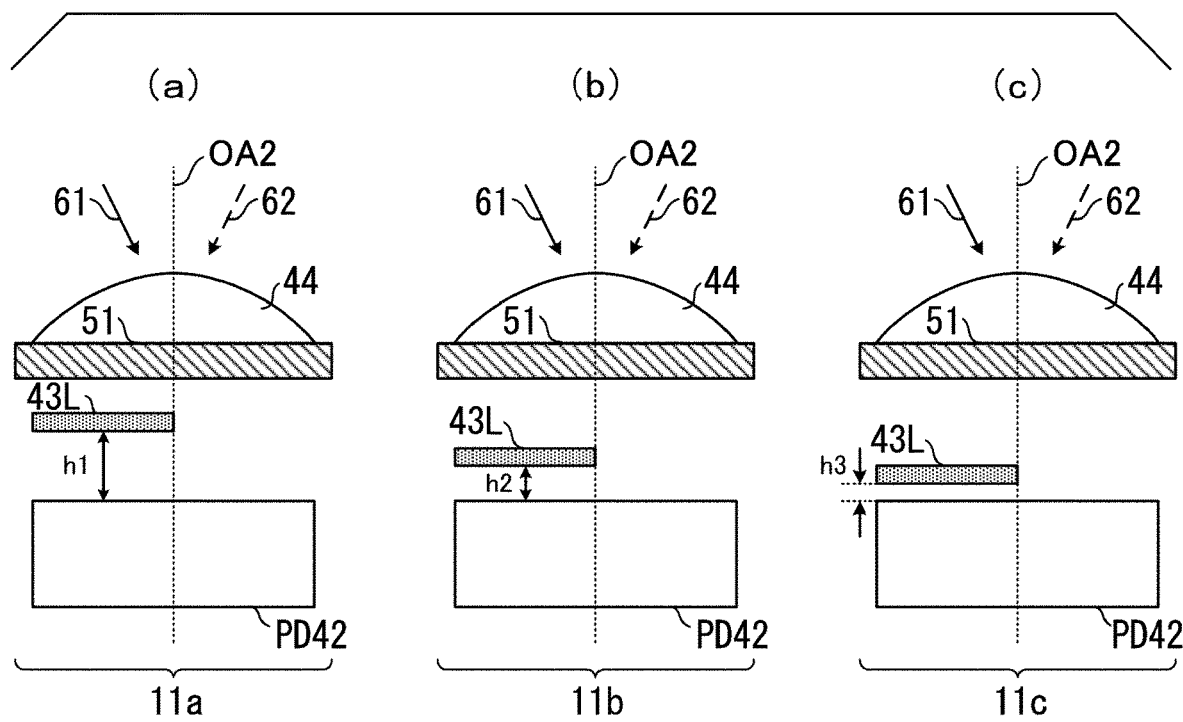
FIG. 22 is a diagram showing a constitution example of focus detection pixels in an imaging device according to a modified example.

In the above-described embodiment, the example in which the first to third AF pixel pairs having different amounts of deviation are disposed on the imaging element 22 as a plurality of types of AF pixel pairs has been described. However, a plurality of types of AF pixel pairs in which arrangement positions of the light-shielding parts between the color filter 51 and the photoelectrical conversion part 42 are different from each other may be disposed in the imaging element 22. FIG. 22 is a diagram showing a constitution example of the focus detection pixel of the imaging element 22 according to the modified example. In the drawing, the same reference numbers are assigned to the same or corresponding parts as those in the above-described embodiment.

The light-shielding part 43L of the first focus detection pixel 11a is provided between the color filter 51 and the photoelectrical conversion part 42 at a predetermined distance h1 from the photoelectrical conversion part 42. The light-shielding part 43L of the first focus detection pixel 11b is provided between the color filter 51 and the photoelectrical conversion part 42 at a predetermined distance h2 from the photoelectrical conversion part 42. Further, the light-shielding part 43L of the first focus detection pixel 11c is provided between the color filter 51 and the photoelectrical conversion part 42 at a predetermined distance h3 from the photoelectrical conversion part 42. The distance h2 is smaller than the distance h1 and is larger than the distance h3. That is, h1>h2>h3. As described above, the first focus detection pixels 11a, 11b, and 11c have different arrangement positions of the light-shielding part 43L. Further, the other second focus detection pixels 12a, 12b, and 12c constituting each AF pixel pair have different arrangement positions of the light-shielding part 43R. Thus, the first to third AF pixel pairs can perform pupil division corresponding to different angles of incidence, as in the case of the above-described embodiment.

Modified Example 7

Figure 23:
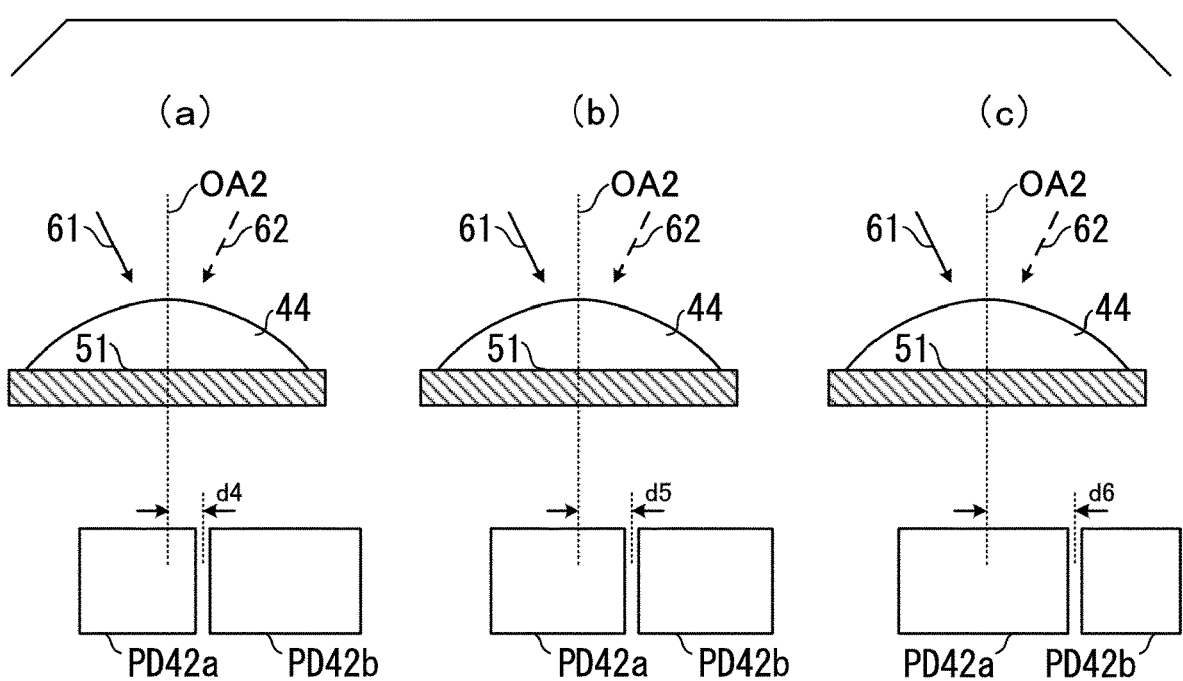
FIG. 23 is a diagram showing a constitution example of focus detection pixels in an imaging device according to a modified example.

FIG. 23 is a diagram showing a constitution example of the focus detection pixel of the imaging element 22 according to a modified example. As an example, FIG. 23 shows a cross-sectional view of part of three types of AF pixel pairs in the focus detection region 100c of FIG. 2. In the drawing, the same reference numbers are assigned to the same or corresponding parts as those in the above-described embodiment. Each of the three types of focus detection pixels shown in FIGS. 23(a) to 23(c) includes a micro-lens 44 and a first photoelectrical conversion part 42a and a second photoelectrical conversion part 42b which photoelectrically convert the light transmitted through the micro-lens 44. In the present modified example, the first to third AF pixel pairs have different light receiving areas in which the first photoelectrical conversion part 42a and the second photoelectrical conversion part 42b receive the light. Also in this case, the first to third AF pixel pairs can perform the pupil division corresponding to different angles of incidence, as in the case of the above-described embodiment.

Modified Example 8

The selection part 214 may select a plurality of types of AF pixel pairs. In this case, the focus detection part 215 may calculate a plurality of amount of defocus using the first and second signals output from each of the plurality of types of AF pixel pairs and may calculate the amount of movement of the focus lens 31b based on an average value of the amount of defocus. For example, the amount of movement of the focus lens 31b may be determined based on an average value between the amount of defocus calculated using the first and second signals Sig1 and Sig2 of the first AF pixel pair, and the amount of defocus calculated using the first and second signals Sig1 and Sig2 of the second AF pixel pair.

Modified Example 9

In the above-described embodiment, the case in which the primary color system (RGB) color filter is used for the imaging element 22 has been described, but a complementary color system (CMY) color filter may be used.

Modified Example 10

The imaging device described in the above-described embodiment and modified example may be applied to a camera, a smartphone, a tablet, a camera built in a PC, an in-vehicle camera, a camera mounted in an unmanned aerial vehicle (a drone, a radio-controlled aircraft, or the like), or the like.

Although various embodiments and modified examples have been described above, the present invention is not limited to the contents thereof. Other aspects conceivable within the scope of the technical idea of the present invention are also included within the scope of the present invention.

The disclosure content of the next priority basic application is incorporated herein as a reference document.

Japanese Patent Application No. 2018-242351 (filed on Dec. 26, 2018)

REFERENCE SIGNS LIST

1 Imaging device
2 Camera body
3 Interchangeable lens
11 Focus detection pixel
12 Focus detection pixel
13 Imaging pixel
22 Imaging element
23 Body memory
31 Photographing optical system
31a Zoom lens
31b Focus lens
31c Aperture
32 Lens control part
33 Lens memory
34 State detection part
35 Distance calculation part
42 Photoelectrical conversion part
44 Micro-lens
210 Body control part
211 Image data generation part
212 Region setting part
214 Selection part
215 Focus detection part

The invention claimed is:

1. An interchangeable lens which is mountable to and removable from a camera body having an imaging part, the imaging part having first and second pixels that each receive light and output a signal used for focus detection, and the lens comprising:
an optical system in which an exit pupil distance changes according to a position of the imaging part on an imaging surface;
an input part in which information on a position on the imaging surface is input from the camera body; and
an output part which outputs to the camera body first information regarding the exit pupil distance of the optical system based on the information input to the input part the camera body selecting first focus detection based on the signal output from the first pixel or second focus detection based on the signal output from the second pixel.

2. The interchangeable lens according to claim 1, wherein the first information is information on the exit pupil distance at a specific position on the imaging surface.

3. The interchangeable lens according to claim 1, wherein the optical system has a variable focus distance, and
the first information is information on the exit pupil distance based on the focus distance.

4. The interchangeable lens according to claim 3, wherein the output part outputs the first information when the focus distance of the optical system changes.

5. The interchangeable lens according to claim 1, further comprising a storage part which stores the first information for each of a plurality of the positions on the imaging surface,
wherein the output part outputs at least some of the first information stored in the storage part.

6. The interchangeable lens according to claim 1, wherein the information on the position on the imaging surface is information on a position of a focus detection region in which the camera body performs focus detection of the optical system.

7. The interchangeable lens according to claim 1, wherein the output part outputs second information on a shape of an exit pupil of the optical system based on the information on the position on the imaging surface.

8. The interchangeable lens according to claim 7, wherein the second information is information on the shape of the exit pupil which changes according to the position on the imaging surface.

9. The interchangeable lens according to claim 7, wherein the second information is information on the shape of the exit pupil at a specific position on the imaging surface.

10. A focus detecting device comprising:
an imaging part having a plurality of focus detection regions each including first and second pixels which each receive light that has passed through an optical system and output a signal used for focus detection;
a selection part which selects first focus detection based on the signal output from the first pixel included in one of the focus detection regions or second focus detection based on the signal output from the second pixel included in the one focus detection region on a basis of first information on an exit pupil distance of the optical system based on information on a position of the one focus detection region on an imaging surface of the imaging part; and
a focus detection part which performs the first focus detection or the second focus detection based on selection of the selection part.

11. The focus detecting device according to claim 10, further comprising a setting part for setting at least one focus detection region among the plurality of focus detection regions,
wherein the selection part selects the first focus detection or the second focus detection based on the first information on the exit pupil distance of the optical system based on information on a position of the focus detection region on the imaging surface of the imaging part set by the setting part.

12. The focus detecting device according to claim 11, wherein
the selection part selects the first focus detection or the second focus detection on a basis of the first information based on the information on the position of the focus detection region farthest from an optical axis of the optical system among the plurality of focus detection regions.

13. The focus detecting device according to claim 10, wherein the first information is information on the exit pupil distance at a specific position on the imaging surface of the optical system in which the exit pupil distance changes according to a position on the imaging surface.

14. The focus detecting device according to claim 10, wherein the focus detection part performs the first focus detection or the second focus detection on a basis of second information on a shape of an exit pupil of the optical system based on the information on the position on the imaging surface.

15. A camera body comprising:
  the focus detecting device according to claim 10; and
  a mounting and removing part to which an interchangeable lens having the optical system is mountable on and removable from.

* * * * *